United States Patent [19]

Hayden et al.

[11] Patent Number: 5,526,369

[45] Date of Patent: Jun. 11, 1996

[54] PHOSPHATE GLASS USEFUL IN HIGH ENERGY LASERS

[75] Inventors: Yuiko T. Hayden, Clarks Summit, Pa.; Stephen A. Payne, Castro Valley, Calif.; Joseph S. Hayden, Clarks Summit, Pa.; John H. Campbell, Livermore, Calif.; Mary Kay Aston, Moscow, Pa.; Melanie L. Elder, Dublin, Calif.

[73] Assignees: Schott Glass Technologies, Inc., Duryea, Pa.; The United States of America as represented by the Department of Energy, Washington, D.C.

[21] Appl. No.: 957,184

[22] Filed: Oct. 7, 1992

[51] Int. Cl.⁶ .................... H01S 3/17; C03C 3/16
[52] U.S. Cl. .................. 372/40; 501/48; 252/301.4 P
[58] Field of Search ................. 372/40; 501/48; 252/301.4 P

[56] References Cited

U.S. PATENT DOCUMENTS

| | | | |
|---|---|---|---|
| 3,979,322 | 10/1976 | Alexeev et al. | 372/40 |
| 4,022,707 | 5/1977 | Deutschbein | 372/40 |
| 4,075,120 | 2/1978 | Meyers et al. | 372/40 |
| 4,191,928 | 3/1980 | Emmett | 372/92 |
| 4,217,382 | 8/1980 | Toratani | 372/40 |
| 4,333,848 | 6/1982 | Myers et al. | 252/301.4 P |
| 4,962,067 | 10/1990 | Myers | 252/301.4 P |
| 5,032,315 | 7/1991 | Hayden | 501/48 |
| 5,173,456 | 12/1992 | Hayden et al. | 501/48 |
| 5,334,559 | 8/1994 | Hayden | 501/48 |

FOREIGN PATENT DOCUMENTS

| | | |
|---|---|---|
| 3340968 | 5/1984 | Germany. |
| 52-125519 | 10/1977 | Japan. |
| 63-233024 | 9/1988 | Japan. |

Primary Examiner—Rodney B. Bovernick
Assistant Examiner—Robert McNutt
Attorney, Agent, or Firm—Millen, White, Zelano & Branigan

[57] ABSTRACT

In a high energy laser system utilizing phosphate laser glass components to amplify the laser beam, the laser system requires a generated laser beam having an emission bandwidth of less than 26 nm and the laser glass components consist essentially of (on an oxide composition basis):

| | Mole % |
|---|---|
| $P_2O_5$ | 50–75 |
| $Al_2O_3$ | >0–10 |
| $K_2O$ | >0–30 |
| MgO | 0–30 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| $La_2O_3$ | 0–8 |
| $Ln_2O_3$ | 0.01–8 | wherein
 the sum of MgO and CaO is >0–30;
 the sum of $Li_2O$, $Na_2O$, $Rb_2O$, and $Cs_2O$ is 0–20;
 the sum of BeO, SrO, BaO, ZnO, and PbO is 0–20;
 the sum of $B_2O_3$ and $Y_2O_3$ is 0–10; and
 $Ln_2O_3$ represents the sum of the oxides of active lasing lanthanides of atomic number 58–71.

61 Claims, 8 Drawing Sheets

5,526,369

PHOSPHATE GLASS USEFUL IN HIGH ENERGY LASERS

Government Rights

The United States government has rights in this invention pursuant to Contract No. W-7405-ENG-48.

SUMMARY OF THE INVENTION

This invention relates to a high energy laser system and a method of generating a laser beam using phosphate laser glasses, typically neodymium-doped, which possess an advantageous combination of property qualities desirable from both laser application and manufacturability points of view. The invention also relates to phosphate laser glasses suitable for use in high energy laser systems.

The term "laser" refers to the amplification of light by the stimulated emission of radiation. In a laser, an active material, for example, a glass suitably doped with an active atomic species such as neodymium, is placed in a cavity resonator formed by two reflecting, or at least partially reflecting, mirrors.

The glasses utilized in the invention offer a combination of properties which are desirable for application in high energy lasers such as high cross section for stimulated emission, low concentration quenching of the excited state lifetime, low nonlinear refractive index, small emission bandwidth, high heat capacity, and low coefficient of thermal expansion. The latter two properties are particularly desirable for applying glasses of this invention as a cladding material.

In accordance, with the invention, solid state lasers used for the generation of high levels of total energy per pulse require that the active material possess a maximum value of the following laser figure-of-merit, $FOM_{laser}$, expressed by $$FOM_{laser} = \frac{\sigma Q}{n_2} \cdot \left[\frac{\rho C_p}{\alpha}\right]^{0.25} \cdot \frac{1}{\Delta\lambda_{em}} \cdot \Delta\lambda_{abs}$$

where $\alpha$ is the thermal expansion;

$\rho$ is the glass density;

$C_p$ is the glass heat capacity;

$\sigma$ is the cross section for stimulated emission;

Q is a measure of lifetime concentration quenching of the excited state;

$n_2$ is the nonlinear refractive index;

$\Delta\lambda_{abs}$ is the average absorption bandwidth; and $\Delta\lambda_{em}$ is the emission bandwidth.

It should be noted that this laser figure-of-merit has been developed in accordance with the invention to provide guidance in selecting glasses for use in high energy laser systems. It is not intended to provide an exact and precise assessment of each glass. Still, the importance of this laser figure-of-merit can be seen from the following discussion.

Laser glasses for application in high energy laser systems preferably have a higher level of cross section for stimulated emission compared to current state-of-the-art laser glasses. Although a large cross section implies a high extraction of stored energy as amplified laser light, a low cross section is known to imply better energy storage ability. The optimum cross section for any particular laser system design thus varies; however, current state-of-the-art high energy laser system designs call for a cross section greater than 3.5×10⁻ 20 cm². This is considered to be a high cross section in comparison to the range of cross sections typically observed in phosphate laser glasses.

The cross section for stimulated emission, $\sigma$, is a particularly important parameter in large fusion laser systems based on Nd-doped glass since larger cross sections are associated with higher extraction efficiencies which are expected to lead to lower overall system costs.

It is desirable in high energy laser systems that the active material have a high value for the concentration quenching factor, Q, which describes the well-known phenomena of nonradiative depletion of the excited laser state by adjacent neodymium ions in the active glass. Using the concentration quenching factor, the emission lifetime quenching curve can be described by:

$$\tau = \frac{\tau_0}{1 + \left(\frac{N}{Q}\right)^2}$$

where $\tau_0$ is the lifetime for a sample containing nearly no neodymium, N is the neodymium doping level in the glass, and Q is a numerical factor expressed in cm⁻³ which best fits experimental data collected on a number of samples of different neodymium concentration. See, e.g., "Spectroscopic Properties of Nd⁺³ Dopant Ions in Phosphate Laser Glasses," Payne et al., Lawrence Livermore National Laboratory, UCRL-JC-105473, May 1991.

The value of nonlinear refractive index, $n_2$, is preferably low since this factor is directly correlated to internal damage of optical components including laser glass by the self focusing of a propagating laser beam. It arises from the change in the refractive index of the glass induced at high intensity, e.g., $$n = n_o + n_2 \phi$$

where n is the refractive index, $n_o$ is the refractive index in the absence of a propagating laser beam and $\phi$ is an indication of the intensity of the propagating laser beam. Additionally, low nonlinearity in the refractive index dependent on laser intensity implies reduced distortion of beam quality as the beam propagates through laser glass components being used to amplify the laser beam.

In state-of-the-art high energy laser system designs, a variant of the glass composition employed as the active laser medium but doped with an ion or ions which absorb strongly in the region of laser activity, e.g., Cu, is attached with adhesives to the edges of slabs or discs fabricated from the active laser glass. During and after excitation of the laser glass there is considerable heating of this bordering or cladding material relative to the active laser material it surrounds. This uneven heating leads to optical distortion of the complete laser glass/cladding glass element due to the uneven heating and expansion of the two glasses. Maximizing the quantity of $$\left[\frac{\rho C_p}{\alpha}\right]^{0.25}$$

minimizes the amount of optical distortion which results for a given temperature increase of the cladding glass relative to the active laser glass it surrounds.

It is also desirable to maximize the absorption bandwidth for the active species in the glass in order to maximize the absorption of flashlamp light and increase the pumping efficiency into the excited state of the laser transition. Since only a fraction (e.g., about 20%) of the total light emitted from flashlamps is actually absorbed by the laser glass, materials characterized by greater average absorption bandwidth, $\Delta\lambda_{abs}$, will lead to a greater fraction of the flashlamp light being absorbed.

Furthermore, it is desirable to minimize the emission bandwidth for the excited species in the glass to maximize the extractable energy stored in the excited stage. Measurements performed at Lawrence Livermore National Laboratory suggest that Nd-doped laser glasses with smaller bandwidths, $\Delta\lambda_{em}$, are characterized by higher extraction efficiencies.

As fusion laser technology advances, the need exists for Nd-doped glass that can be used in laser systems that will likely produce more than five or even ten times as much output energy as the current state-of-the-art fusion laser systems (i.e., $\geq 0.5$ or 1.0 megajoules (MJ) versus 0.1 MJ at a wavelength of 355 mm from the NOVA laser at Lawrence Livermore National Laboratory).

New high energy laser systems require large quantities of active laser glass (e.g., at least about 200, 300, 500, 1000, 2000, 3000, or 4000 optical glass components each of, for example, at least about 10 l in volume) which preferably can be produced in a short time period with high manufacturing yield, thereby minimizing the cost of the material to the end user. Solid state laser materials for these high energy laser systems should also preferably offer, in combination with good laser properties as discussed above, outstanding properties from the point of view of manufacturability. Thus, the glasses utilized in the present invention, simultaneously with offering good characteristics for laser application, also preferably possess desirable characteristics related to manufacturability such as high thermal conductivity, low Poisson's ratio, small coefficient of thermal expansion, low Young's modulus, high fracture toughness, a low glass transformation point, good water resistance of the glass surface, high solubility for platinum, and high stability by being resistant to devitrification and crystallization during melting and forming.

Therefore, it is desirable that, in accordance with the invention, the glasses exhibit a maximum value of the following production figure-of-merit, $FOM_{prod}$, expressed by $$FOM_{prod} = \beta^2 K_{1c} \cdot D_{Pt} \cdot F_{Wdur} \cdot 1/T_g \cdot F_{Dvit}$$

where $$\beta = \frac{\kappa(1-\nu)}{\alpha E} ;$$

$\kappa$ is thermal conductivity;

$\nu$ is Poisson's Ratio;

$\alpha$ is thermal expansion;

E is Young's modulus;

$K_{1c}$ is fracture toughness;

$T_g$ is glass transformation point;

$F_{Wdur}$ is durability of the glass to water;

$F_{Dvit}$ is the crystallization and devitrification tendency of the glass; and $D_{pt}$ is a measure of the ability of the glass to dissolve platinum.

It should be noted that this production figure-of-merit has been developed in accordance with the invention to serve as a guide in the selection of laser glasses. It is not intended to suggest an exact precise assessment of each glass. This production figure-of-merit in accordance with the invention is, however, important as can be seen from the following discussion.

The production figure-of-merit, $FOM_{prod}$, described above includes a term $\beta$ where $$\beta = \frac{\kappa(1-\nu)}{\alpha E} ;$$

and $\kappa$ is thermal conductivity, $\nu$ is Poisson's Ratio, $\alpha$ is the thermal expansion, and E is Young's modulus. This is a well known thermal-mechanical figure-of-merit which is an indication of the likelihood that glass will break while incurring thermal and mechanical stresses associated with the manufacturing steps of annealing, grinding, polishing, cutting, routine handling, etc. This term appears twice in the expression for $FOM_{prod}$, once to reflect its importance in annealing of glass, and once with $K_{1c}$, the fracture toughness of the glass, as a reflection of its importance as a thermal shock figure-of-merit in the important manufacturing steps of fabricating, e.g., polishing, cutting, handling, etc., a final block, slab, disc, rod, etc.

The $FOM_{prod}$ expression also includes $1/T_g$ to reflect the reduced time and effort needed to fully anneal large castings of glass which have a small transformation temperature.

Also included in $FOM_{prod}$ are the important measures of platinum solubility, $D_{pt}$, and devitrification tendency, $F_{Dvit}$.

$D_{pt}$ is evaluated by submerging a section of platinum into a molten glass melt, e.g., at temperatures of 1300° C. to 1400° C. depending on the viscosity of each glass under evaluation for 4 hours with the melt under an oxygen atmosphere. Platinum dissolution into the glass melt is evidenced by a yellow coloration of the samples, corresponding to absorption of the glass in the blue part of the spectrum. The resultant ability to dissolve platinum is evaluated by measuring the absorption coefficient of glass samples at 400 nm. See, e.g., "Platinum Solubility in Phosphate Laser Glass," Hayden et al , Lawrence Livermore National Laboratory, UCRL-JC-105475, June 1991.

During the development of this invention, $F_{Dvit}$ was not precisely quantitatively evaluated. Instead, glasses were accepted or rejected (that is to say, $F_{Dvit}$ was set equal to 1 or 0, respectively) based on microscopic visual inspection of a platinum strip containing samples of the glass under evaluation which had been placed in a gradient furnace covering, temperatures from 600° C. to 1000° C., for a time sufficient so that any tendency toward devitrification or crystallization was evident upon removal of the strip from the furnace. It is also possible to identify glasses with a severe devitrification tendency by Differential Thermal Analysis (DTA) which detects and displays exothermic or endothermic reactions within a small sample of the glass under evaluation. See, e.g., "Thermal-Mechanical and Physical Chemical Phosphate Laser Glasses," Elder et al , Lawrence Livermore National Laboratory, UCRL-JC-105474, July 1991.

A glass which is more aggressive to platinum is easier to produce in a form free of metallic platinum particles which, upon absorption of laser radiation, become damage sites within the final glass element, potentially rendering the material useless as a high quality optical element. In a similar manner, a stable glass which is not prone to devitrification during manufacturing is easier to produce in a form free of crystals and free of phase separation, which is important for production of glasses with the high optical quality essential for laser glass used in high energy laser systems.

Also appearing in $FOM_{prod}$ is a measure of glass durability toward attack by water, $F_{Wdur}$. This parameter is evaluated by submerging a sample of the glass to be tested in 50° C. water for 24 hours, measuring the weight loss, and normalizing the result per square centimeter of tested area. The weight loss per square centimeter of tested area is referred to as $D_{wdur}$. See, e.g., Elder et al., supra.

Potentially, a somewhat higher solubility in water is an advantage during the glass polishing; however, it is desirable that $F_{Wdur}$ not be so large that the glass is readily attacked by sources of water such as humidity to which surfaces might be exposed during storage or actual use. Consistent with this, glasses with values of $D_{wdur} >0.3$ mg/cm²/day were rejected; that is, the value of $F_{Wdur}$ was set equal to 0.

It is known for some time that phosphate laser glasses have a low threshold value for the laser effect, and phosphate glass compositions have been commercially available for some time as optical components for use in laser systems.

Nevertheless, a need has remained for improved development of phosphate compositions, e.g., to simultaneously improve both the thermal-mechanical properties and the laser properties of phosphate laser glasses, thus making available glasses which combine in the same material properties desirable both for manufacturability with a high production yield and for application as an active laser material.

Prior art phosphate laser glasses contain a wide variety of components including, for example, $Al_2O_3$, $SiO_2$, alkali metal oxides ($Na_2O$, $K_2O$, $Li_2O$, especially), alkaline earth metal oxides, etc., in addition to the base component, $P_2O_5$. Prior art glasses having the good laser properties desirable high energy solid state laser systems are described in U.S. Pat. Nos. 4,075,120; 4,248,732; and 4,239,645. However, the glasses of these inventions are thermomechanically somewhat undesirable from the manufacturability point of view. These glasses do not emphasize the identity or the amount of alkali and alkaline earth metal oxides.

Other phosphate laser glasses place emphasis on the use of $K_2O$ and $BaO$ to impart pronounced athermal character to the laser glass. See, e.g., U.S. Pat. No. 4,022,707; U.S. Pat. No. 4,076,541; and U.S. Pat. No. 4,108,673. While other publications require the use of $Li_2O$, e.g., U.S. Pat. No. 4,929,387, and/or MgO, e.g., U.S. Pat. No. 5,032,315, to obtain glasses with exceptional properties for use in high average power laser systems. Still another publication, U.S. Pat. No. 4,333,848, emphasizes the use of $Li_2O$ with BaO to achieve this athermal characteristic in a laser glass.

Still other laser glass publications exist which prescribe the necessary use of $SiO_2$, e.g., U.S. Pat. No. 4,820,662, DE 34 35 133, JP 51-107312, and DE 36 09 247, and/or $B_2O_3$, e.g., U.S. Pat. No. 4,661,284, to obtain improvements in the characteristics desirable in laser glasses for high power solid state laser systems.

Many other laser phosphate publications exist which describe a wide variety of glasses such as JP 49-114615(4), JP 60-191029(3), JP 51-107311, JP 50-3411, JP 51-30812, SU-355,916, U.S. Pat. No. 3,846,142. In these patents, no particular emphasis is placed on alkali metal oxides. Further patents equate all metal oxides, e.g., U.S. Pat. No. 4,120, 814, U.S. Pat. No. 3,979,322, U.S. Pat. No. 4,225,459, U.S. Pat. No. 3,580,859, and U.S. Pat. No. 4,470,922.

JP 54-38311 indicates a preference for $Li_2O$, but in phosphate glasses containing components such as CuO and $V_2O_5$.

It has now been discovered that the requirements for high energy laser systems can be satisfied through the employment of phosphate glasses having a desirable combination of laser properties and simultaneously having a desirable combination of properties for manufacturability.

The invention thus relates to a high energy laser system using a phosphate glass possessing desirable properties such as high cross section for stimulated emission, low emission bandwidth, low concentration quenching of the excited state lifetime, low nonlinear refractive index, high heat capacity and low coefficient of thermal expansion, in combination with desirable characteristics related to manufacturability such as high thermal conductivity, low Poisson's ratio, small coefficient of thermal expansion, low Young's modulus, high fracture toughness, a low glass transformation point, good water resistance of the glass surface, high solubility for platinum and high stability as shown by being resistant to devitrification and crystallization during melting and forming.

In accordance with one aspect, the invention relates to a high energy laser system utilizing phosphate laser glass components in which the parameters of the laser system and the beam generated thereby require that the phosphate laser glass components have an emission bandwidth of less than 26 nm, and wherein the glass consists essentially of (on an oxide composition basis):

|  | Mole % | | |
| --- | --- | --- | --- |
|  | General | Preferred | Especially Preferred |
| $P_2O_5$ | 50–75 | 55–75 | 60–70 |
| $Al_2O_3$ | >0–10 | 1–9 | 2–6 |
| $K_2O$ | >0–30 | 8–28 | 10–24 |
| MgO | 0–30 | 0–24 | 0–20 |
| CaO | 0–30 | 0–24 | 0–20 |
| $Li_2O$ | 0–20 | 0–15 | 0–10 |
| $Na_2O$ | 0–20 | 0–15 | 0–10 |
| $Rb_2O$ | 0–20 | 0–15 | 0–10 |
| $Cs_2O$ | 0–20 | 0–15 | 0–10 |
| BeO | 0–20 | 0–15 | 0–10 |
| SrO | 0–20 | 0–15 | 0–10 |
| BaO | 0–20 | 0–15 | 0–10 |
| ZnO | 0–20 | 0–15 | 0–10 |
| Pbo | 0–20 | 0–15 | 0–10 |
| $B_2O_3$ | 0–10 | 0–8 | 0–5 |
| $Y_2O_3$ | 0–10 | 0–8 | 0–5 |
| $La_2O_3$ | 0–8 | 0–5 | 0–4 |
| $Ln_2O_3$ | 0.1–8 | 0.1–8 | 0.1–8 |
| Sum RO (R = Mg, Ca) | >0–30 | 4–24 | 5–20 |
| Sum R'$_2$O (R' = Li, Na, Rb, Cs) | 0–20 | 0–15 | 0–10 |
| Sum R"O (R" = Be, Sr, Ba, Zn, Pb) | 0–20 | 0–15 | 0–10 |
| Sum R'''$_2$O$_3$ (R''' = B, Y) | 0–10 | 0–8 | 0–5 |

$Ln_2O_3$ represents the sum of the oxides of active lasing lanthanides of atomic number 58-71. The preferred active lasing species is $Nd_2O_3$. It is also possible to use nonlanthanide active lasing species (e.g., Ti or V) in place of $Ln_2O_3$.

In accordance with the invention, the laser system preferably can operate at an energy level of at least about 0.1 MJ, particularly at least 0.5 MJ, 1.0 MJ, 1.5 MJ, or 2.0 MJ, and especially up to at least 3.0 MJ, 4.0 MJ or 5.0 MJ (for example, about 0.2–10 nanosecond pulse lengths at an energy level of at least 0.5 MJ and a wavelength of 355 nm). Further, the laser system preferably focuses at least about 100 beams on a target and use at least 200 laser glass components.

Laser systems operating at such energy levels require laser glass exhibiting high extraction efficiencies. For this reason, it has been determined that laser glass components having a low $\Delta\lambda_{em}$, preferably <26 nm, are needed. A high cross section, e.g., $>3.5\times10^{-20}$ cm², is also advantageous.

In other preferred aspects, the glass also has the following important properties:

| | |
|---|---|
| Damaging inclusions per liter | essentially zero |
| Stability to devitrification | high |
| Stability to crystallization | high |
| $\kappa$, thermal conductivity | >0.5 W/mK |
| $\nu$, Poisson's ratio | <.28 |
| $\alpha$, thermal expansion from 20–300° C. | <145 × 10$^{-7}$/K |
| E, Young's modulus | <50 GPa |
| $K_{1c}$, fracture toughness | >0.40 MPa m$^{1/2}$ |
| $\rho$, glass density | >2.60 g/cm$^3$ |
| $C_p$, glass heat capacity | >0.50 J/gK |
| $\sigma$, cross section | >3.5 × 10$^{-20}$ cm$^2$ |
| Q, concentration quenching factor | >7 × 10$^{20}$ cm$^{-3}$ |
| $n_2$, nonlinear refractive index | <1.2 × 10$^{-13}$ esu |
| $\Delta\lambda_{abs}$ | >17 nm |
| $\Delta\lambda_{em}$ | <26 nm |
| $T_g$, glass transformation point | <460° C. |
| $D_{wdur}$, durability of the glass to water | <0.20 mg/cm$^2$ day |
| $D_{Pt}$, platinum solubility (@400 nm) | >0.03 cm$^{-1}$ |

It is further preferred that these properties exceed even these goals, e.g.,

| | |
|---|---|
| $\kappa$, thermal conductivity | >0.55 W/mK |
| $\alpha$, thermal expansion from 20–300° C. | <140 × 10$^{-7}$/K |
| E, Young's modulus | <45 GPa |
| $K_{1c}$, fracture toughness | >0.50 MPa m$^{1/2}$ |
| $\sigma$, cross section | >4.0 × 10$^{-20}$ cm$^2$ |
| Q, concentration quenching factor | >8 × 10$^{20}$ cm$^{-3}$ |
| $n_2$, nonlinear refractive index | <1.1 × 10$^{-13}$ esu |

BRIEF DESCRIPTION OF THE DRAWINGS

Various other objects, features and attendant advantages of the present invention will be more fully appreciated as the same becomes better understood when considered in conjunction with the following discussion and the accompanying drawings wherein.

DETAILED DESCRIPTION

Special emphasis in this invention is placed on those properties which appear in the following, abbreviated FOM formulae:

$$FOM_{laser} = \frac{\sigma Q}{n_2}$$

and $$FOM_{prod} = \frac{\kappa(1-\nu)}{\alpha E}.$$

wherein the meaning of each is discussed above.

Also emphasized are the properties of emission bandwidth, platinum solubility, and devitrification tendency. Preferably, FOM$_{laser}$ is >25 (esu.cm)$^{-1}$, FOM$_{prod}$ is >0.60× 10$^{-6}$ m$^2$/sec, bandwidth for emission is <26 nm, D$_{pt}$ is >0.025 cm$^{-1}$ at 400 nm, and the glass exhibits good stability as evaluated by visual inspection for the presence of crystallization, devitrification, phase separation, etc.

These glass compositions employ P$_2$O$_5$ as the principle glass former. The level of P$_2$O$_5$ is preferably maximized. Generally, the P$_2$O$_5$ content is 50–75, preferably 55–75, especially 60–70 mole %. The P$_2$O$_5$ content can also be defined in terms of 51, 52, 53, 54, 56, 57, 58, 59, 61, 62, 63, 64, 65, 66, 67, 68, 69, 71, etc., mole %.

Al$_2$O$_3$ is also an important component. It imparts to the glass better chemical durability and better thermomechanical properties such as $\kappa$ and $\alpha$. However, the amount of Al$_2$O$_3$ should not be so high as to induce crystallization. The level of Al$_2$O$_3$ is generally >0 to 10%, preferably 1–9%, especially 2–6 mole %. Other levels of Al$_2$O$_3$ are 3, 4, 5 and 7 mole %.

Figure 1A:
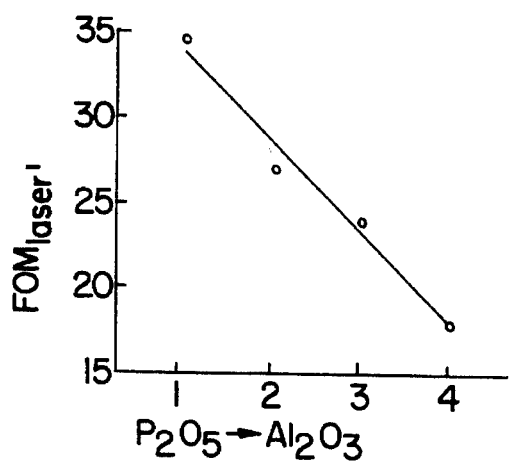
FIGS. 1a, 1b and 1c show the values of FOM$_{laser}$, defined below, for the glass examples of Tables 1, 2, and 3, respectively.
Figure 1B:
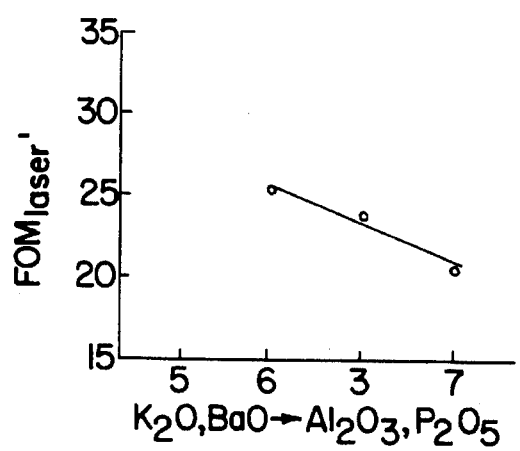
Figure 1C:
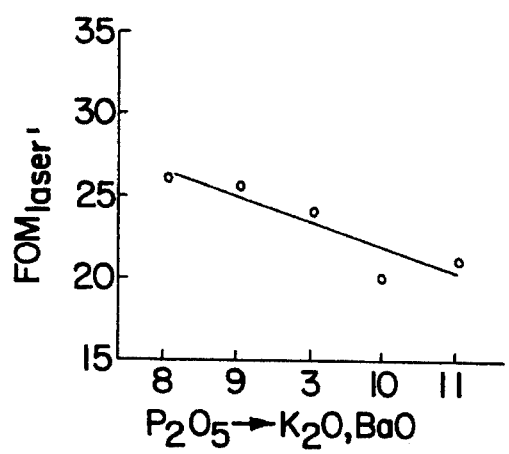

FIGS. 1a, 1b and 1c show the results of FOM$_{laser}$ evaluations for glass compositions in Tables 1, 2 and 3. As can be seen in FIG. 1a, high levels of P$_2$O$_5$ and minimal utilization of Al$_2$O$_3$ provide a high value of FOM$_{laser}$ due to a reduction in the value of n$_2$, while increasing Q and $\sigma$. FIG. 1b shows that a reduction in modifier content, in this case, K$_2$O and BaO, has a detrimental impact of FOM$_{laser}$. FIG. 1c indicates that a high level of P$_2$O$_5$, over modifier content, is preferred.

Figure 2A:
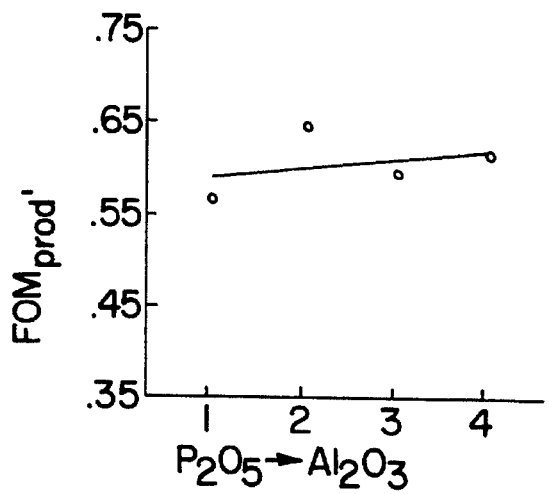
FIGS. 2a, 2b and 2c show the values of FOM$_{prod}$, defined below, for the glass examples of Tables 1, 2, and 3, respectively.
Figure 2B:
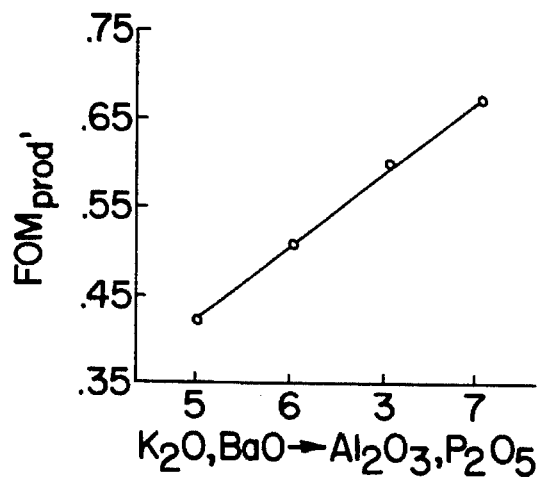
Figure 2C:
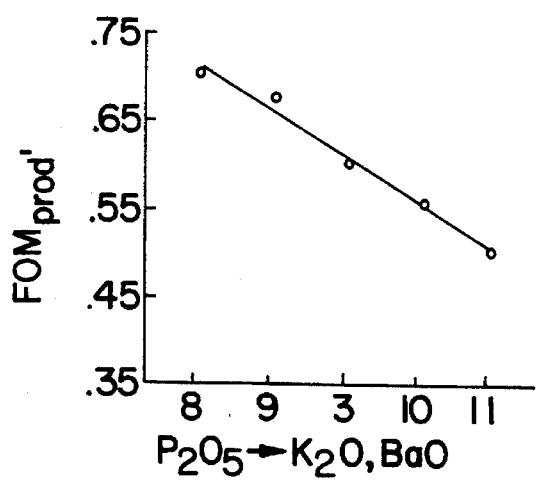

FIGS. 2a, 2b and 2c show the results of FOM$_{prod}$ evaluations for glass compositions in Tables 1, 2 and 3. FIG. 2a shows that, in addition to high levels of P$_2$O$_5$, some level of Al$_2$O$_3$ increase still offers a slight improvement in FOM$_{prod}$. FIG. 2b and FIG. 2c demonstrate the preference in these glasses for high P$_2$O$_5$ in order to increase the value of FOM$_{prod}$.

The alkali metal content and identity are particularly important. In particular, the presence of potassium is important for meeting the parameters necessary for simultaneously raising the figures of merit for both laser application and manufacturability. Generally, the amount of K$_2$O is >0 to 30%, preferably 8–28%, especially 469 10–24 mole %. The amount of K$_2$O can also be 1, 2, 3, 4, 5, 6, 7, 9, 11, 12, 13, 14, 15, 16, 17, 18, 19, 20, 21, 22, 23, 25, etc., mole %.

Small additions of sodium are generally tolerable, e.g., less than about 3 to 5 mole % Na$_2$O. The amount acceptable will vary somewhat as a function of base glass composition. Low amounts of lithium are also acceptable in the glasses. In general, less than about, e.g., 3 to 5 mole % Li$_2$O, is consistent with producing a glass with the mentioned desirable characteristics for manufacturability and application in high energy laser systems. In general, the total amount of the alkali metal oxides Li$_2$O, Na$_2$O, Rb$_2$O and Cs$_2$O will be 0–20%, preferably 0–15%, especially 0–10 mole %, e.g., 1, 2, 3, 4, 5, 6, 7, 8, 9, 10, 11, 12, 13, 14, 16, etc., mol %.

Figure 3A:
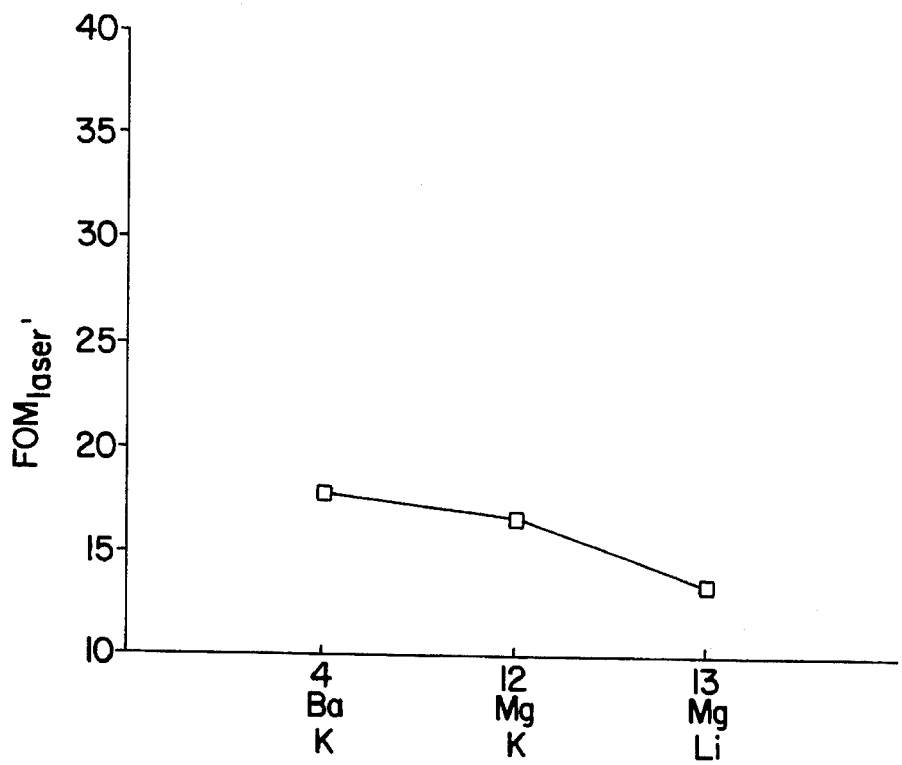
FIGS. 3a, 3b and 3c show the values of FOM$_{laser}$, for the glass examples of Tables 4 and 5.
Figure 3B:
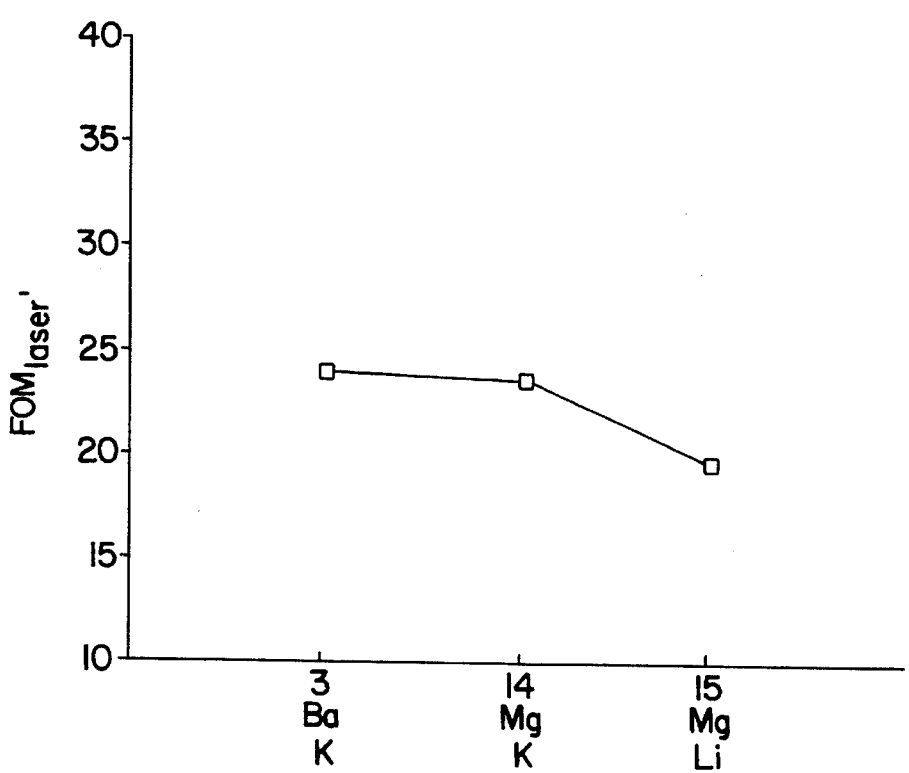
Figure 3C:
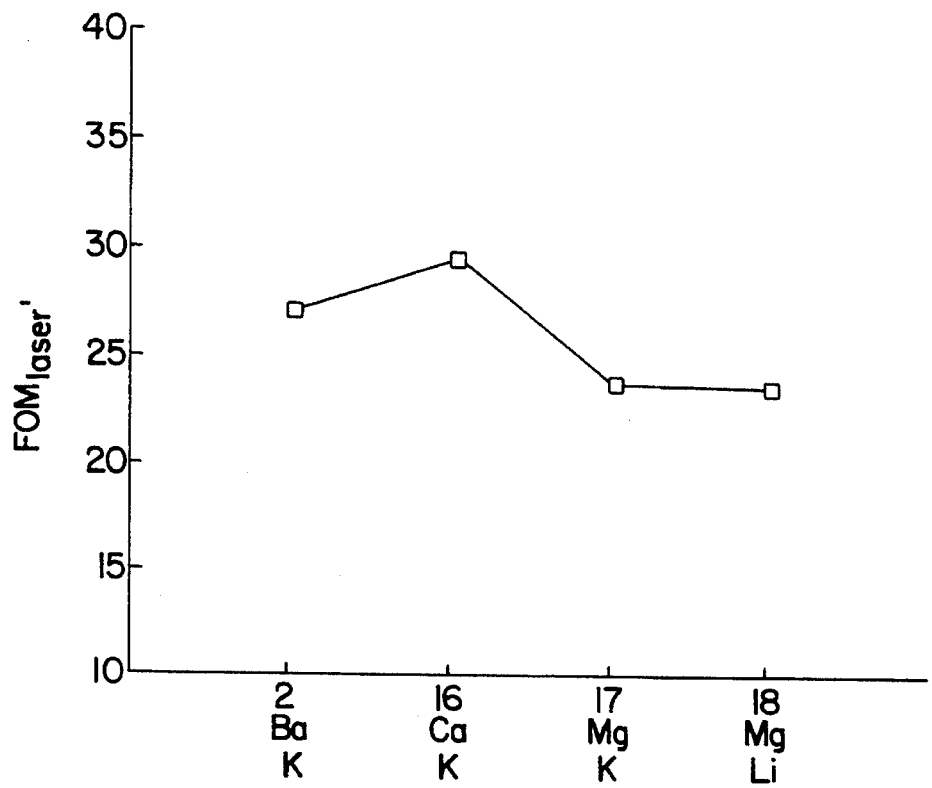
Figure 4A:
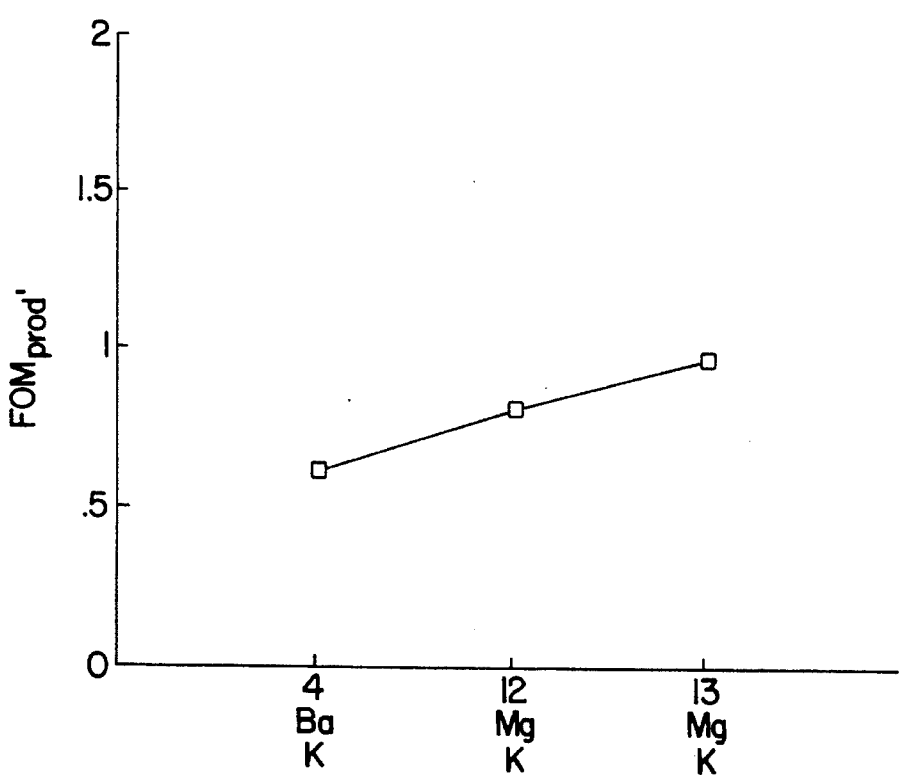
FIGS. 4a, 4b and 4c show the values of FOM$_{prod}$, for the glass examples of Tables 4 and 5.
Figure 4B:
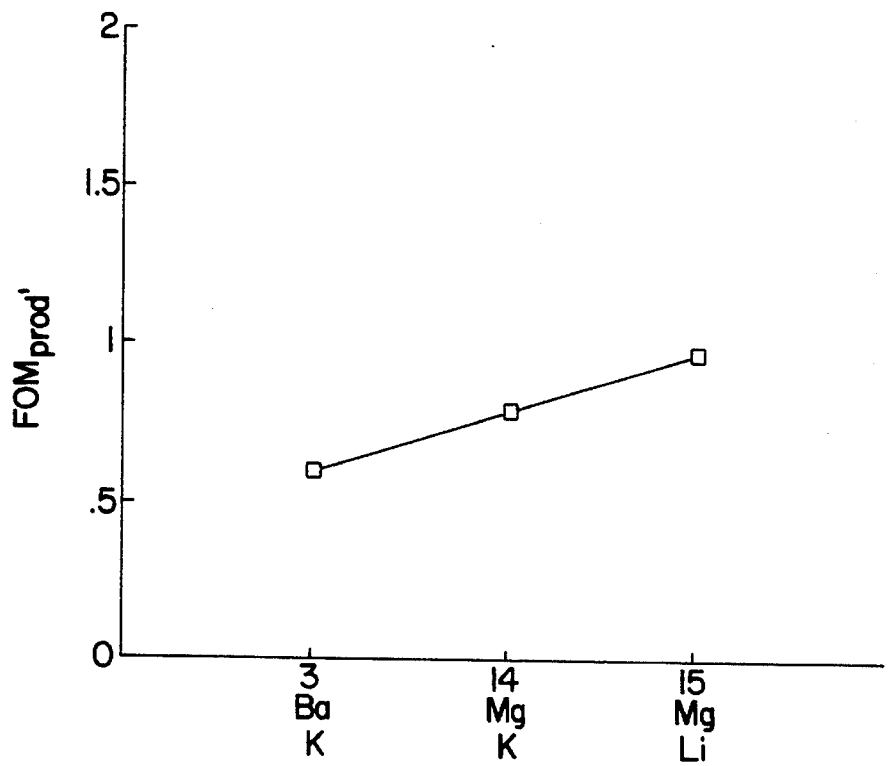
Figure 4C:
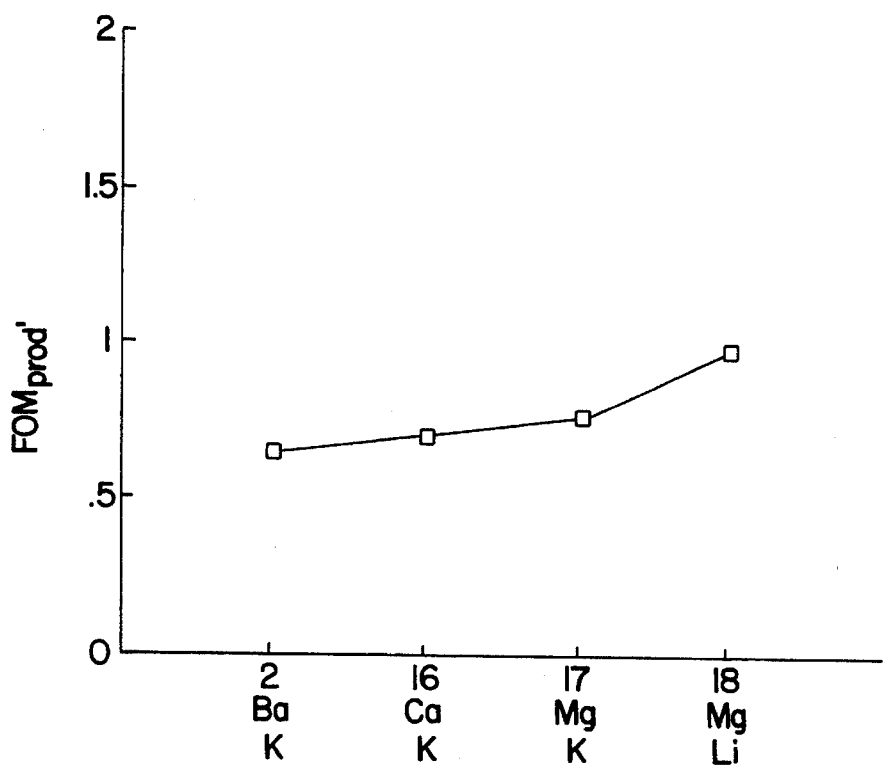
Figure 5A:
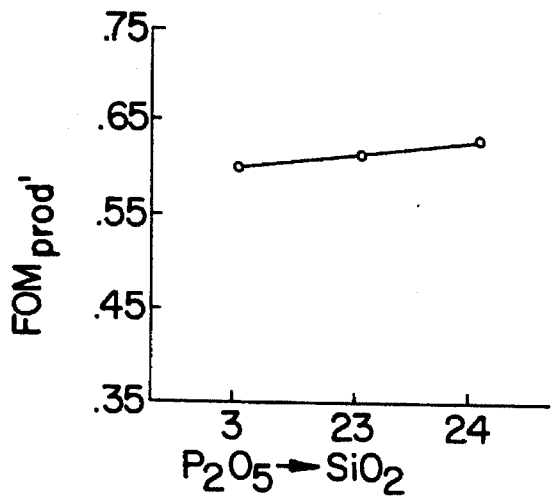
FIGS. 5a, 5b, 5c and 5d show the values of FOM$_{prod}$, for the glass examples of Tables 6 and 7.
Figure 5B:
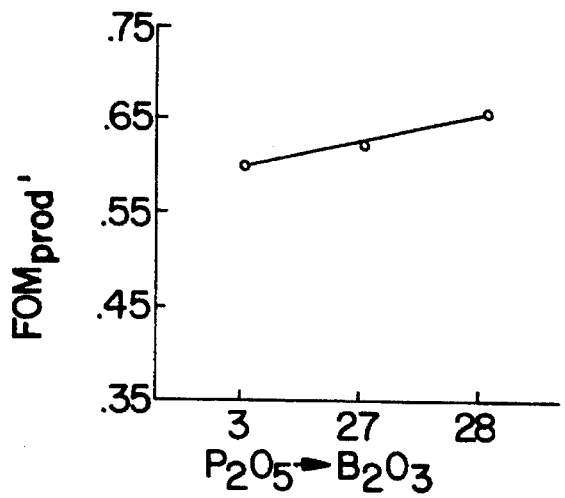
Figure 5C:
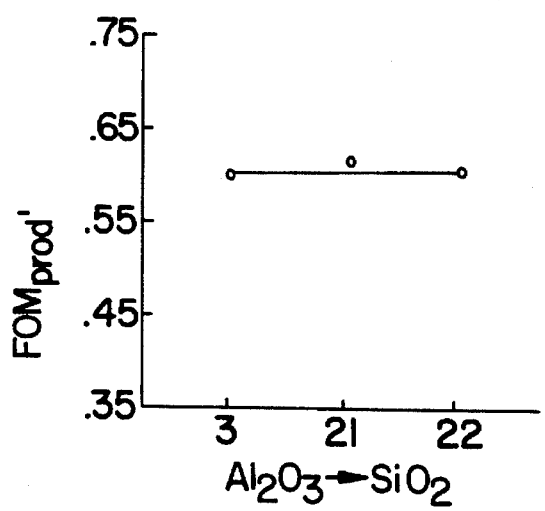
Figure 5D:
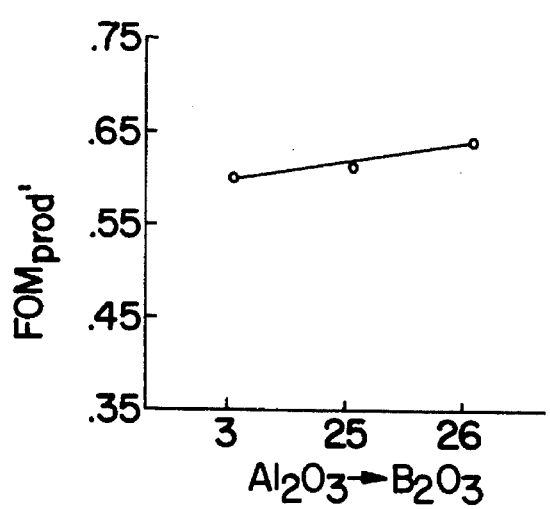
Figure 6A:
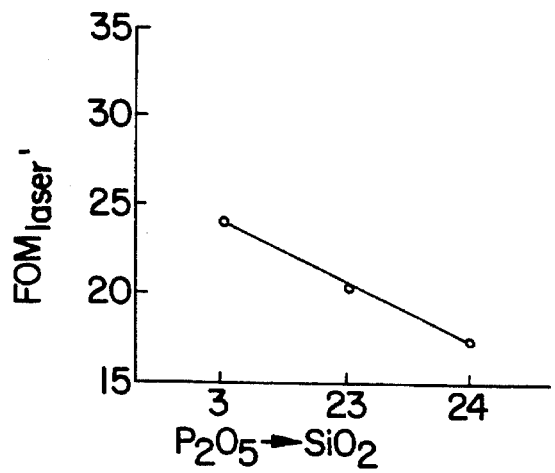
FIGS. 6a, 6b, 6c and 6d show the values of FOM$_{laser}$, for the glass examples of Tables 6 and 7.
Figure 6B:
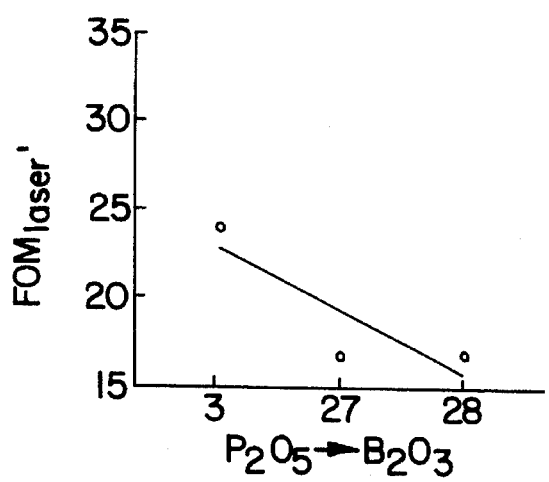
Figure 6C:
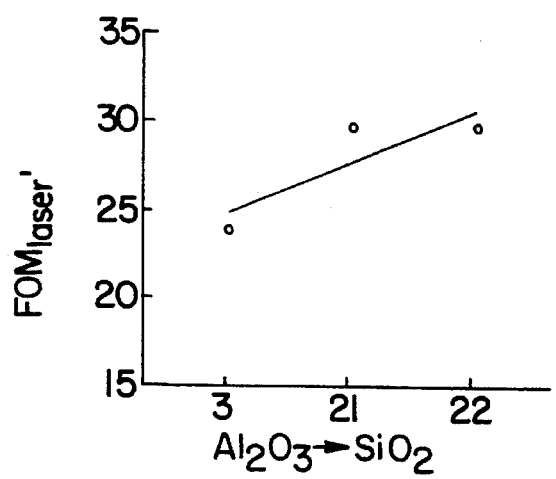
Figure 6D:
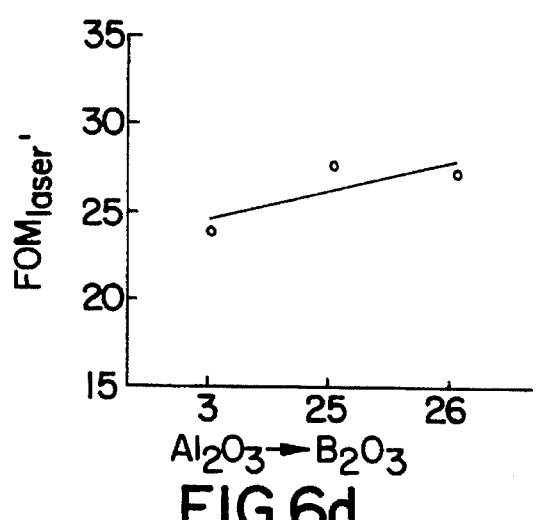

As can be seen in FIG. 3a, FIG. 3b and FIG. 3c, incorporation of high molecular weight alkali metals provides a high value of FOM$_{laser}$, due to reduction in the value of n$_2$, simultaneously with increasing and marginally impacting the value of Q. On the other hand, low molecular weight alkali metal species impart to a glass desirable thermomechanical properties which lead to a high value for FOM$_{prod}$. See FIG. 4a, FIG. 4b and FIG. 4c.

The alkaline earth metal content and identity are also of particular importance. In particular, the presence of CaO and/or MgO is desirable for meeting the parameters necessary for simultaneously offering a high figure-of-merit for both laser application and manufacturability. Generally, the amount of MgO is 0–30 mole %, preferably 0–24 mole %, especially 0–20 mole %, e.g., 0–7 mole %. Similarly, the amount of CaO is generally 0–30%, preferably 0–24%, especially 0–20 mole %, e.g., 7–30 mole %. The combined amount of MgO and CaO, however, is preferably >0–30%, particularly 4–24%, especially 5–20%. Other possible amounts for either MgO or CaO are 1, 2, 3, 4, 5, 6, 8, 9, 10, 11, 12, 13, 14, 15, 16, 17, 18, 19, etc., mole %.

It is possible to have MgO or CaO present without the other. For example, the glass can contain >0–30 mole % MgO without any CaO, or >0–30 mole % CaO without any MgO, such as 5–20 mole % CaO or 10–15 mole % CaO.

Barium, BaO, can also be present; the amount acceptable will vary somewhat as a function of base glass composition. In general, the amount of BaO is 0–20%, preferably 0–15%, especially 0–10 mole %, for example, about 3 to 5 mole % or less BaO is consistent with producing a glass with the mentioned desirable characteristics for manufacturability and application in laser systems for producing high energy levels.

As can be seen in FIGS. 3a, 3b, and 3c, incorporation of high molecular weight alkaline earth metals provides only a slightly higher value of $FOM_{laser}$, due to an increase in the value of $n_2$, combined with minimal impact on the value of Q and an increase in the value of σ. However, as demonstrated in FIGS. 4a, 4b, and 4c, low molecular weight alkali metal species also impart desirable thermomechanical properties to the glass leading to a higher value for $FOM_{prod}$.

The addition of $SiO_2$ and $B_2O_3$ while not required can improve thermomechanical properties. The impact of $SiO_2$ and $B_2O_3$ substitutions for either $P_2O_5$ or $Al_2O_3$ are similar, as shown in FIGS. 5a–5d and FIGS. 6a–6d.

Figure 7:
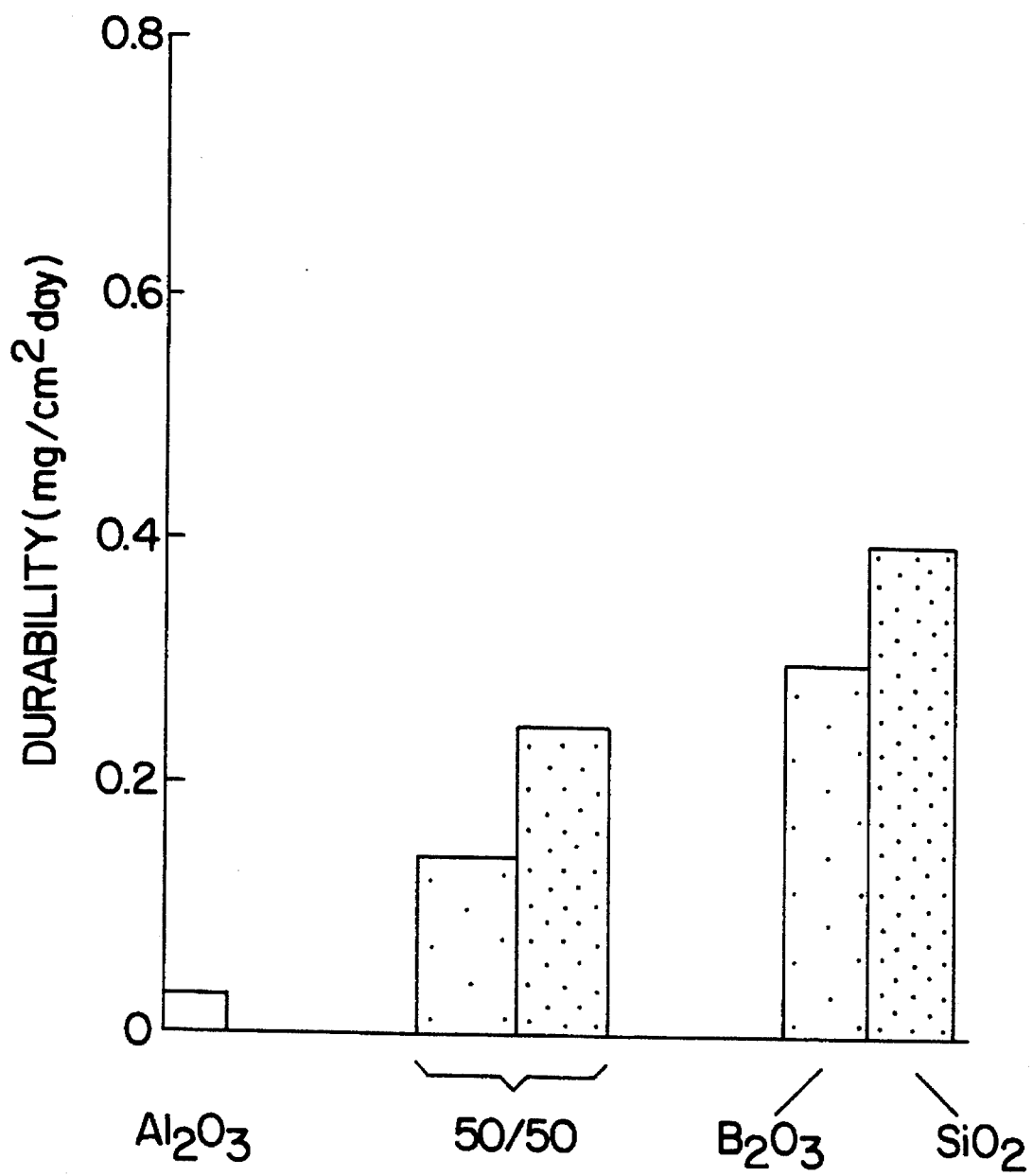
FIG. 7 shows the values of D$_{wdur}$ for some glass examples of Tables 6 and 7.

Substitutions of $SiO_2$ and $B_2O_3$ for $Al_2O_3$ are advantages for laser properties. See, e.g., FIGS. 6a and 6c, which shows substitutions of $SiO_2$. Substitution of $B_2O_3$ for $Al_2O_3$ results in an increase in $FOM_{laser}$ due to a smaller value of $n_2$ and larger values for Q and σ. The inclusion of $SiO_2$ and $B_2O_3$ is, however, detrimental to durability of the glass to attack by water, as seen in FIG. 7. Here, the increase in glass dissolution rate, expressed as mg of material lost per square centimeter of tested surface per day of exposure, is documented for partial, e.g., 50%, and complete replacement of $Al_2O_3$ by $B_2O_3$ and $SiO_2$.

With respect to BeO, SrO, BaO, ZnO and PbO, the amount of these metal oxides are each generally within the range 0–20%, preferably 0–15%, especially 0–10 mole %, with their total combined amount also being generally 0–20%, preferably 0–15%, especially 0–10 mole %.

The amounts of $B_2O_3$ and $Y_2O_3$ present are each generally 0–10%, preferably 0–8%, especially 0–5 mole %. Similarly, the total combined amount of $B_2O_3$ and $Y_2O_3$ is generally 0–10%, preferably 0–8%, especially 0–5 mole %.

As mentioned above, it is desirable for the glass to have a maximal $P_2O_5$ content and, in turn, to possess a high amount of $P_2O_5$ relative to modifiers. Therefore, the value of $P_2O_5/(3\Sigma R_2O_3+MgO)$, wherein R is Al, La, Ln, Y and B, is preferably at least about 1.5, particularly at least about 2.0, and especially at least about 2.3.

When used as a lasing medium, the amount of a lasing species or lasing system (e.g., a lasing species/energy transfer species combination) present in the glass is effective for lasing, e.g., often 0.01–8 mole % (on an oxide basis) in total. Optionally, higher amounts can be used, e.g., up to 10% or even up to 20% or higher in total.

$Nd_2O_3$, the most preferred lasing species, is added to the glasses in sufficient quantity to achieve the desired lasing activity, as is true for other lasing species and systems. At excessively high concentration levels ($Nd_2O_3$ or other lasing species), quenching of the fluorescence emission will occur. As a result, there is a corresponding drop in fluorescence lifetime of the excited state involved in the lasing transition. Suitable upper limits in a given case can be routinely determined. For example, the glass can contain 0.01, 0.05, 0.08, 0.1, 0.3, 0.5, 0.8, 1.0, 1.3, 1.5, 1.8, 2.0, 2.5, 3.0, 3.5, 4.0, 4.5, 5.0 mole %, etc.

Any conventional glass lasing species, lanthanide or nonlanthanide, can be used, e.g., Nd, Tm, Yb, Dy, Pm, Tb, Er, Ho, Ti, V, Cr, Eu, Sm, etc. In another embodiment of the present invention, the laser compositions can contain suitable co-dopants along with primary lasing ions. These include transition metals such as chromium and vanadium or lanthanide ions such as thulium and erbium. These have broad and intense absorption bands and resultant co-dopant fluorescence bands which overlap with the primary lasing ion absorption levels. This phenomena leads to a more efficient conversion of pump radiation into the excited state population of lasing ions.

The total amount of these active ions alone or in combination is 0.01–8 mole % (on an oxide basis), typically. However, as noted above, higher amounts can be used where appropriate, e.g., 7, 8, 9, 10, 11, 12, 13, 14, 15, 17, 25 mole %, etc. See, for example, Physics of Laser Fusion, Volume IV, "The Future Development of HighPower Solid State Laser Systems," Emmett et al , Lawrence Livermore National Laboratory, UCRL-53344, November 1982.

Addition of $La_2O_3$ allows direct substitution of $Nd_2O_3$ or other lasing or energy transfer lanthanide species by another oxide which is nearly an exact structural replacement of, e.g., $Nd_2O_3$. This allows the manufactured glass to be produced with a broad range of neodymium or other lasing species doping levels while minimizing the change from this adjustment on the physical, optical, and thermal properties of the produced glasses. Thus, $La_2O_3$ amounts typically are 0–8 mole %, preferably 0–5 mole %, especially 0–4 mole %, for example, 0.1, 0.2, 0.3, 0.5, 1.0, 1.2, 1.4, 1.6, 1.8, 2.0, 2.2, 2.5, 2.8, 3.0 mole %, etc. However, higher contents are possible, e.g., up to 10% or even 20%, as a replacement for the lanthanide lasing species.

It is further possible to add small amounts, e.g., 0.1–0.3 wt. %, of conventional refining agents such as $As_2O_3$ and $Sb_2O_3$ to the composition to aid in manufacturing while not compromising the combination of properties achieved in the present invention. It is additionally possible to add small antisolarization effective amounts, e.g., 0.1–1.5 wt. %, of conventional antisolarants such as $TiO_2$, $CeO_2$ and $Nb_2O_5$ (as well as others, e.g., $SiO_2$ and $Sb_2O_2$) to suppress solarization of these glasses during exposure to intense UV radiation common during application as an active lasing material.

It is also possible to omit a lasing species entirely within the glass, e.g., when it is desired to use the glass in other applications (such as in optical elements, e.g., lenses, mirrors, undoped laser fiber cladding glasses, analogous to the cladding glasses of U.S. Pat. No. 4,217,382, etc.), where their exceptional combination of properties is beneficial. For example, a suitable optical glass component would correspond to the phosphate laser glass composition described above except that the lasing species is omitted and is replaced by 0.01–8 mole % $La_2O_3$.

It is also possible to omit the lasing species entirely and to instead dope the glass with one or more metal species, e.g., Cu or Sm, which impart light-filtering characteristics to the glass, e.g., for their use in other applications, such as filters, doped laser glass claddings for large discs, slabs, or other forms (see, e.g., U.S. Pat. No. 4,849,036), fibers (see, e.g., U.S. Pat. No. 4,217,382), etc., where their exceptional combination of properties is beneficial.

A suitable doped laser glass cladding, for example, would correspond to the above phosphate laser glass composition except that the active lasing species would be omitted and replaced by a component that would not adversely affect the heat capacity and thermal expansion coefficient (e.g., 0.01–8 moles $La_2O_3$) and the glass would further contain a dopant capable of absorbing the laser wavelength, for example, >0.0–2.0 wt. % of $Cu_2O$, e.g., 0.1, 0.3, 0.5 or 1 wt. % or about 10–30 wt. % $Sm_2O_3$, e.g., 10, 15, 20, 25 or 30 wt. % for a lasing wavelength of Nd in phosphate glasses, i.e., 1.05–1.06 microns.

The laser phosphate glass composition described above can also be used as a glass waveguide. For example, the glass could be used to provide a plate waveguide wherein a certain region of the glass plate is treated (e.g., by ion exchange) to provide regions having different refractive indexes such that light will be guided through a specific region of the glass plate.

The phosphate laser glass composition may also be used as an incident light detector by virtue of its characteristic luminescence. In a glass containing fluorophores, absorbed incident light will induce the fluorophores to luminesce thereby indicating absorption of incident light.

Of course, as is clear from the foregoing discussion, the glasses of this invention are completely compatible with current state-of-the-art manufacturing methods for phosphate laser glasses. The melting, refining, homogenizing and casting of these glasses can be accomplished using the current standard procedures employed by the glass industry. The highly thermal stress resistant glasses of this invention can be formed into slabs, rods, discs, fibers, and other shapes required by the laser community and others by conventional forming techniques well known in the glass industry. The resultant glasses are of high thermal conductivity, low thermal coefficient of expansion, low Young's modulus, high cross section for stimulated emission, low nonlinear refractive index, and exhibit reduced concentration quenching of the upper state involved in the laser transition. In addition, the resultant glasses have a high solubility rate for platinum and are stable against devitrification and crystallization. Thus, these glasses are readily fabricated in large volume pieces free of metallic particles and crystalline inclusions which can become macroscopic damage sites when used in a high energy laser system.

The glasses of this invention can be fully conventionally prepared by mixing the appropriate amounts of each constituent to form a batch composition which is then charged into a fused silica crucible and melted by induction heating from, e.g., 1100° C. to as much as 1500° C., depending on the chosen composition. The glass can then be refined at temperatures exceeding, e.g., 1300° C. from typically 2 to 4 hours, again depending on composition and melt viscosity, with equal intervals of gas bubbling and stirring. The glass is then typically cast into steel molds and annealed at the transformation temperature plus about 20° C. for about 2 hours followed by cooling at about 30° C./hour. These procedures were followed in the examples below.

As noted above, the examples of this application are melted in a fused silica crucible. Under such melting conditions, as is well known, there will be some silica added from the crucible to the final glass composition. Accordingly, whereas all compositions given in this disclosure refer to the component contents as added to the batch as is conventional (batch compositions), where a fused silica crucible is employed, the final composition will contain some silica, regardless of whether $SiO_2$ is added as a batch component. This conventional difference from the initial batch composition is analogous to other differences between final glass compositions and batch compositions, e.g., due to the volatilization of ingredients, etc. The additional amount of silica over and above the amount included in the batch compositions will generally be no more than about 3.5, 3, 2.5, 2, 1.5, 1, 0.5 mole %, etc., especially not more than about 3 mole % and most especially not more than about 2 mole % (all on a renormalized basis). In a preferred aspect of this invention, there is no silica added to the batch compositions, and the final composition contains no more than 3 mole % silica, especially not more than 2 or 1 mole % silica (on the mentioned basis) due to the effect of silica dissolution from the crucible. Of course, where a nonsilica-containing crucible is employed, this effect will not occur.

The silica contribution from the crucible will vary conventionally with melt temperature and melting time. For example, in a melt of about 2 hours at a temperature of about 1300° C., about 2 wt. % of silica will be contributed from a quartz crucible, the precise amount being determined by the precise conditions involved such as glass volume exposed, crucible surface area, glass composition, degree of agitation in the melt, etc.

Without further elaboration, it is believed that one skilled in the art can, using the preceding description, utilize this invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications cited above are hereby incorporated by reference.

EXAMPLES

It will be noted that several of the examples achieve properties falling outside the ranges described above as desirable. These examples thus demonstrate the importance of certain factors discussed above in achieving the desired properties. Most importantly, such examples provide valuable guidance as to how routine experimentation may be utilized to select compositions within the general composition space defined for this invention. Fully conventional consideration will, of course, be given by skilled workers in any study of these examples to the experimental errors involved in measuring the disclosed properties, e.g., ±4% for thermal conductivity and ±1% for thermal coefficient of expansion.

TABLE 1

| Oxide/Melt No. | 1 | 2 | 3 | 4 |
|---|---|---|---|---|
| $P_2O_5$ | 67 | 63 | 59 | 55 |
| $SiO_2$ | | | | |
| $Al_2O_3$ | 0 | 4 | 8 | 12 |
| $B_2O_3$ | | | | |
| $Li_2O$ | | | | |
| $Na_2O$ | | | | |
| $K_2O$ | 15 | 15 | 15 | 15 |
| BaO | 15 | 15 | 15 | 15 |
| MgO | | | | |
| CaO | | | | |
| $Nd_2/La_2O_3$ | 3 | 3 | 3 | 3 |
| Total | 100 | 100 | 100 | 100 |
| $n_d$(@587.6 nm) | 1.53178 | 1.53513 | 1.54005 | 1.54691 |
| Abbe No. | 65.84 | 65.88 | 65.84 | 66.18 |
| Tg (°C.) DTA | 384.3 | 432.8 | 467 | 487.8 |
| density (g/cm³) | 2.8987 | 2.9354 | 2.9829 | 3.0524 |
| κ (W/mK) (@90° C.) | .46 | .53 | .52 | .55 |
| Poisson's ratio (v) | .27 | .27 | .27 | .26 |
| α ($10^{-7}$/K) (@20–300° C.) | 147.6 | 133.2 | 128.7 | 119.8 |
| E ($10^6$ GPa) | 40.3 | 44.9 | 49.6 | 54.7 |
| $n_2$ ($10^{-13}$ esu) | 1.18 | 1.18 | 1.19 | 1.21 |
| $C_p$ (J/gK) | .59 | .61 | .59 | .63 |
| $K_{1c}$ (MPa m$^{1/2}$) | .54 | .45 | .39 | .33 |
| $D_{Pt}$ (cm$^{-1}$) (@400 nm) | | .0452 | .0306 | .0284 |
| $D_{Wdur}$ (mg/cm²/day) | .1923 | .0594 | .0302 | .0505 |
| σ ($10^{-20}$ cm²) | 4.45 | 4.04 | 3.61 | 3.26 |
| $\Delta\lambda_{em}$ (nm) | 23.31 | 24.73 | 26.62 | 28.36 |
| τ (rad) μsec | 325.7 | 335.9 | 348.6 | 357.5 |
| $\tau_0$ (μsec) | 336.5 | 352.6 | 361.7 | 368.8 |
| Q ($10^{20}$ cm$^{-3}$) | 9.14 | 7.91 | 7.9 | 6.62 |
| Devit. Coeff. (0 or 1) | 1 | 1 | 1 | 0 |
| Durabil. Coeff. (0 or 1) | 0 | .1 | 1 | 1 |

DTA = Differential Thermal Analysis

TABLE 2

| Oxide/Melt No. | 5 | 6 | 3 | 7 |
|---|---|---|---|---|
| $P_2O_5$ | 51.4 | 55.4 | 59 | 63 |
| $SiO_2$ | | | | |
| $Al_2O_3$ | 0 | 4 | 8 | 12 |
| $B_2O_3$ | | | | |
| $Li_2O$ | | | | |
| $Na_2O$ | | | | |
| $K_2O$ | 22.8 | 18.8 | 15 | 11 |
| BaO | 22.8 | 18.8 | 15 | 11 |
| MgO | | | | |
| CaO | | | | |
| $Nd_2/La_2O_3$ | 3 | 3 | 3 | 3 |
| Total | 100 | 100 | 100 | 100 |
| $n_d$(@587.6 nm) | 1.53901 | 1.53837 | 1.54005 | 1.5389 |
| Abbe No. | 64.38 | 65.27 | 65.84 | 66.33 |
| Tg (°C.) DTA | 373.6 | 422.2 | 467 | 528.3 |

TABLE 2-continued

| Oxide/Melt No. | 5 | 6 | 3 | 7 |
|---|---|---|---|---|
| density (g/cm³) | 3.0816 | 3.0163 | 2.9829 | 2.823 |
| κ (W/mK) (@90° C.) | .43 | .47 | .52 | .60 |
| Poisson's ratio (v) | .30 | .28 | .26 | .25 |
| α ($10^{-7}$/K) (@20–300° C.) | 184.7 | 154 | 128.7 | 121.6 |
| E ($10^6$ GPa) | 38.2 | 43.4 | 49.6 | 54.7 |
| $n_2$ ($10^{-13}$ esu) | 1.23 | 1.2 | 1.19 | 1.18 |
| $C_p$ (J/gK) | .57 | .58 | .59 | .62 |
| $K_{1c}$ (MPa m$^{1/2}$) | .34 | .4 | .39 | .58 |
| $D_{Pt}$ (cm$^{-1}$) (@400 nm) | | .0335 | .0306 | .0251 |
| $D_{Wdur}$ (mg/cm²/day) | .74581 | .1403 | .0302 | .0521 |
| σ ($10^{-20}$ cm²) | 3.92 | 3.89 | 3.61 | 3.43 |
| $\Delta\lambda_{em}$ (nm) | 25.69 | 25.49 | 26.62 | 28.21 |
| τ (rad) μsec | 334.5 | 337.1 | 348.6 | 345.7 |
| $\tau_0$ (μsec) | 346.2 | 357 | 361.7 | 362.1 |
| Q ($10^{20}$ cm$^{-3}$) | 5.72 | 7.83 | 7.9 | 7.1 |
| Devit. Coeff. (0 or 1) | 1 | 0 | 1 | 1 |
| Durabil. Coeff. (0 or 1) | 0 | 0 | 1 | 1 |

DTA = Differential Thermal Analysis

TABLE 3

| Oxide/Melt No. | 8 | 9 | 3 | 10 | 11 |
|---|---|---|---|---|---|
| $P_2O_5$ | 67 | 63 | 59 | 55 | 51 |
| $SiO_2$ | | | | | |
| $Al_2O_3$ | 8 | 8 | 8 | 8 | 8 |
| $B_2O_3$ | | | | | |
| $Li_2O$ | | | | | |
| $Na_2O$ | | | | | |
| $K_2O$ | 11 | 13 | 15 | 17 | 19 |
| BaO | 11 | 13 | 15 | 17 | 19 |
| MgO | | | | | |
| CaO | | | | | |

TABLE 3-continued

| Oxide/Melt No. | 8 | 9 | 3 | 10 | 11 |
|---|---|---|---|---|---|
| $Nd_2/La_2O_3$ | 3 | 3 | 3 | 3 | 3 |
| Total | 100 | 100 | 100 | 100 | 100 |
| $n_d$(@587.6 nm) | 1.53602 | 1.53736 | 1.54005 | 1.544 | 1.54699 |
| Abbe No. | 66.23 | 65.4 | 65.84 | 65.59 | 64.97 |
| Tg (°C.) DTA | 499.2 | 492 | 467 | 480 | 443 |
| density (g/cm$^3$) | 2.8865 | 2.9216 | 2.9829 | 3.0336 | 3.0966 |
| κ (W/mK) (@90° C.) | .56 | .54 | .52 | .54 | .50 |
| Poisson's ratio (ν) | .26 | .27 | .26 | .28 | .28 |
| α ($10^{-7}$/K) (@20–300° C.) | 112.4 | 115.9 | 128.7 | 139.4 | 143 |
| E ($10^6$ GPa) | 52.6 | 50.7 | 49.6 | 49.8 | 49.4 |
| $n_2$ ($10^{-13}$ esu) | 1.17 | 1.18 | 1.19 | 1.21 | 1.23 |
| $C_p$ (J/gK) | .62 | .61 | .59 | .59 | .61 |
| $K_{1c}$ (MPa m$^{1/2}$) | .46 | .45 | .39 | .32 | .29 |
| $D_{Pt}$ (cm$^{-1}$) (@400 nm) | .0435 | | .0306 | | .0315 |
| $D_{Wdur}$ (mg/cm$^2$/day) | .0136 | .0153 | .0302 | .0707 | .0963 |
| σ ($10^{-20}$ cm$^2$) | 3.78 | 3.7 | 3.61 | 3.52 | 3.44 |
| $\Delta\lambda_{em}$ (nm) | 25.45 | 26.19 | 26.62 | 27.35 | 27.91 |
| τ (rad) μsec | 346.4 | 345.6 | 348.6 | 344.1 | 344.3 |
| $τ_0$ (μsec) | 359.5 | 359.9 | 361.7 | 358.1 | 351.6 |
| Q ($10^{20}$ cm$^{-3}$) | 8.03 | 8.14 | 7.9 | 6.91 | 7.53 |
| Devit. Coeff. (0 or 1) | 0 | 1 | 1 | 1 | 0 |
| Durabil. Coeff. (0 or 1) | 1 | 1 | 1 | 1 | 1 |

DTA = Differential Thermal Analysis

TABLE 4

| Oxide/Melt No. | 4 | 12 | 13 | 3 | 14 | 15 |
|---|---|---|---|---|---|---|
| $P_2O_5$ | 55 | 55 | 55 | 59 | 59 | 59 |
| $SiO_2$ | | | | | | |
| $Al_2O_3$ | 12 | 12 | 12 | 8 | 8 | 8 |
| $B_2O_3$ | | | | | | |
| $Li_2O$ | | | 15 | | | 15 |
| $Na_2O$ | | | | | | |
| $K_2O$ | 15 | 15 | | 15 | 15 | |
| BaO | 15 | | | 15 | | |
| MgO | | 15 | 15 | | 15 | 15 |
| CaO | | | | | | |
| $Nd_2/La_2O_3$ | 3 | 3 | 3 | 3 | 3 | 3 |
| Total | 100 | 100 | 100 | 100 | 100 | 100 |
| $n_d$(@587.6 nm) | 1.54691 | 1.52111 | 1.53833 | 1.54005 | 1.51963 | 1.53692 |
| Abbe No. | 66.18 | 67.25 | 66.14 | 65.84 | 67.41 | 66.47 |
| Tg (°C.) DTA | 487.8 | 523.7 | 469.8 | 467 | 529 | 478.3 |
| density (g/cm$^3$) | 3.0524 | 2.6984 | 2.6955 | 2.9829 | 2.6638 | 2.6799 |
| κ (W/mK) (@90° C.) | .55 | .67 | .86 | .52 | .64 | .82 |
| Poisson's ratio (ν) | .26 | .25 | .28 | .26 | .24 | .23 |
| α ($10^{-7}$/K) (@20–300° C.) | 119.8 | 106.5 | 89.8 | 128.7 | 110.5 | 93.6 |
| E ($10^6$ GPa) | 54.7 | 58.4 | 71.2 | 49.6 | 55.3 | 69 |
| $n_2$ ($10^{-13}$ esu) | 1.21 | 1.09 | 1.18 | 1.19 | 1.08 | 1.16 |
| $C_p$ (J/gK) | .63 | .73 | .74 | .59 | .68 | .75 |
| $K_{1c}$ (MPa m$^{1/2}$) | .33 | .47 | .4 | .39 | .49 | .57 |
| $D_{Pt}$ (cm$^{-1}$) (@400 nm) | .0284 | | | .0306 | .0254 | .0118 |
| $D_{Wdur}$ (mg/cm$^2$/day) | .0505 | .123 | .0378 | .0302 | .037 | .006 |
| σ ($10^{-20}$ cm$^2$) | 3.26 | 3.05 | 3.03 | 3.61 | 3.4 | 3.26 |
| $\Delta\lambda_{em}$ (nm) | 28.36 | 29.36 | 29.77 | 26.62 | 27.75 | 29.24 |
| τ (rad) μsec | 357.5 | 379.3 | 369.4 | 348.6 | 360.5 | 348 |
| $τ_0$ (μsec) | 368.8 | 393.2 | 386.3 | 361.7 | | |
| Q ($10^{20}$ cm$^{-3}$) | 6.62 | 5.98 | 5.26 | 7.9 | 7.5 | 7 |
| Devit. Coeff. (0 or 1) | 0 | 1 | 0 | 1 | 1 | 1 |
| Durabil. Coeff. (0 or 1) | 1 | 0 | 1 | 1 | 1 | 1 |

DTA = Differential Thermal Analysis

TABLE 5

| Oxide/Melt No. | 2 | 16 | 17 | 18 |
|---|---|---|---|---|
| $P_2O_5$ | 63 | 63 | 63 | 63 |
| $SiO_2$ | | | | |
| $Al_2O_3$ | 4 | 4 | 4 | 4 |
| $B_2O_3$ | | | | |

TABLE 5-continued

| Oxide/Melt No. | 2 | 16 | 17 | 18 |
|---|---|---|---|---|
| $Li_2O$ | | | | 15 |
| $Na_2O$ | | | | |
| $K_2O$ | 15 | 15 | 15 | |
| BaO | 15 | | | |
| MgO | | | 15 | 15 |
| CaO | | 15 | | |
| $Nd_2/La_2O_3$ | 3 | 3 | 3 | 3 |
| Total | 100 | 100 | 100 | 100 |
| $n_d$(@587.6 nm) | 1.53513 | 1.51947 | 1.5177 | 1.53503 |
| Abbe No. | 65.88 | 66.39 | 67.09 | 65.98 |
| Tg (°C.) DTA | 432.8 | 452 | 502.7 | 462 |
| density (g/cm³) | 2.9354 | 2.637 | 2.6502 | 2.6591 |
| κ (W/mK) (@90° C.) | .53 | .55 | .62 | .80 |
| Poisson's ratio (ν) | .27 | .25 | .25 | .22 |
| α ($10^{-7}$/K) (@20–300° C.) | 133.2 | 121.8 | 116.5 | 97.6 |
| E ($10^6$ GPa) | 44.9 | 48.2 | 52.2 | 65.3 |
| $n_2$ ($10^{-13}$ esu) | 1.18 | 1.1 | 1.08 | 1.17 |
| $C_p$ (J/gK) | .61 | .66 | .7 | .75 |
| $K_{1c}$ (MPa m$^{1/2}$) | .45 | .52 | .6 | .69 |
| $D_{Pt}$ (cm$^{-1}$) (@400 nm) | .0452 | | | .0202 |
| $D_{Wdur}$ (mg/cm²/day) | .0594 | .2 | .0624 | .0371 |
| σ ($10^{-20}$ cm²) | 4.04 | 3.93 | 3.66 | 3.55 |
| Δλ$_{em}$ (nm) | 24.73 | 25.35 | 26.41 | 26.9 |
| τ (rad) μsec | 335.9 | | 355 | 349.8 |
| τ$_0$ (μsec) | 352.6 | | 364.6 | 367.1 |
| Q ($10^{20}$ cm$^{-3}$) | 7.91 | 8.27 | 7 | 7.76 |
| Devit. Coeff. (0 or 1) | 1 | 0 | 1 | 0 |
| Durabil. Coeff. (0 or 1) | 1 | 0 | 1 | 1 |

DTA = Differential Thermal Analysis

TABLE 6

| Oxide/Melt No. | 3 | 19 | 20 | 21 | 22 | 23 | 24 |
|---|---|---|---|---|---|---|---|
| $P_2O_5$ | 59 | 55 | 51 | 59 | 59 | 53 | 47 |
| $SiO_2$ | | 8 | 16 | 4 | 8 | 6 | 12 |
| $Al_2O_3$ | 8 | 4 | | 4 | | 8 | 8 |
| $B_2O_3$ | | | | | | | |
| $Li_2O$ | | | | | | | |
| $Na_2O$ | | | | | | | |
| $K_2O$ | 15 | 15 | 15 | 15 | 15 | 15 | 15 |
| BaO | 15 | 15 | 15 | 15 | 15 | 15 | 15 |
| MgO | | | | | | | |
| CaO | | | | | | | |
| $Nd_2/La_2O_3$ | 3 | 3 | 3 | 3 | 3 | 3 | 3 |
| Total | 100 | 100 | 100 | 100 | 100 | 100 | 100 |
| $n_d$(@587.6 nm) | 1.54005 | 1.53465 | 1.53391 | 1.53518 | 1.53624 | 1.54072 | 1.54286 |
| Abbe No. | 65.84 | 65.81 | 65.23 | 65.88 | 65.76 | 65.74 | 65.44 |
| Tg (°C.) DTA | 467 | 452 | 419.6 | 448.5 | 419 | 482.1 | 483.5 |
| density (g/cm³) | 2.9829 | 2.9443 | 2.9497 | 2.9477 | 2.947 | 3.002 | 3.0195 |
| κ (W/mK) (@90° C.) | .52 | .51 | .49 | .51 | .50 | .54 | .55 |
| Poisson's ratio (ν) | .26 | .27 | .27 | .27 | .27 | .26 | .26 |
| α ($10^{-7}$/K) (@20–300° C.) | 128.7 | 134.4 | 137.7 | 134 | 139 | 131.6 | 125.2 |
| E ($10^6$ GPa) | 49.6 | 45.1 | 43.6 | 45.3 | 43.4 | 49.3 | 51.5 |
| $n_2$ ($10^{-13}$ esu) | 1.19 | 1.18 | 1.18 | 1.17 | 1.18 | 1.19 | 1.21 |
| $C_p$ (J/gK) | .59 | .61 | .62 | .62 | .59 | .61 | .58 |
| $K_{1c}$ (MPa m$^{1/2}$) | .39 | .49 | .77 | .42 | .39 | .38 | .43 |
| $D_{Pt}$ (cm$^{-1}$) (@400 nm) | .0306 | | | | .0406 | | |
| $D_{Wdur}$ (mg/cm²/day) | .0302 | .2588 | 14.05 | .07065 | .3887 | .1445 | .175 |
| σ ($10^{-20}$ cm²) | 3.61 | 3.87 | 3.89 | 3.89 | 4.07 | 3.41 | 3.22 |
| Δλ$_{em}$ (nm) | 26.62 | 25.3 | 25.02 | 25.47 | 24.76 | 27.65 | 28.9 |
| τ (rad) μsec | 348.6 | 341.2 | 345.2 | 337.9 | 332.5 | 352.5 | 357.2 |
| τ$_0$ (μsec) | 361.7 | 357.5 | | 351.8 | 346.6 | 363.7 | 369.6 |
| Q ($10^{20}$ cm$^{-3}$) | 7.9 | 7.88 | | 8.92 | 8.62 | 7.1 | 6.5 |
| Devit. Coeff. (0 or 1) | 1 | 1 | 0 | 1 | 1 | 1 | 0 |
| Durabil. Coeff. (0 or 1) | 1 | 0 | 0 | 1 | 0 | 0 | 0 |

DTA = Differential Thermal Analysis

TABLE 7

| Oxide/Melt No. | 3 | 25 | 26 | 27 | 28 |
|---|---|---|---|---|---|
| $P_2O_5$ | 59 | 59 | 59 | 53 | 47 |
| $SiO_2$ | | | | | |
| $Al_2O_3$ | 8 | 4 | 0 | 8 | 8 |
| $B_2O_3$ | | 4 | 8 | 6 | 12 |
| $Li_2O$ | | | | | |
| $Na_2O$ | | | | | |
| $K_2O$ | 15 | 15 | 15 | 15 | 15 |
| BaO | 15 | 15 | 15 | 15 | is |
| MgO | | | | | |
| CaO | | | | | |
| $Nd_2/La_2O_3$ | 3 | 3 | 3 | 3 | 3 |
| Total | 100 | 100 | 100 | 100 | 100 |
| $n_d$(@587.6 nm) | 1.54005 | 1.53624 | 1.53437 | 1.54298 | 1.54892 |
| Abbe No. | 65.84 | 65.64 | 66.02 | 66.02 | 65.89 |
| Tg (°C.) DTA | 467 | 449 | 423.5 | 488.3 | 512.2 |
| density (g/cm³) | 2.9829 | 2.9354 | 2.9091 | 3.0068 | 3.043 |
| κ (W/mK) (@90° C.) | .52 | .51 | .53 | .54 | .61 |
| Poisson's ratio (ν) | .26 | .27 | .27 | .27 | .26 |
| $\alpha$ ($10^{-7}$/K) (@20–300° C.) | 128.7 | 133.3 | 138.7 | 123.6 | 123.8 |
| E ($10^6$ GPa) | 49.6 | 46.2 | 43.6 | 51.9 | 55.2 |
| $n_2$ ($10^{-13}$ esu) | 1.19 | 1.18 | 1.16 | 1.21 | 1.21 |
| $C_p$ (J/gK) | .59 | .59 | .65 | .62 | .59 |
| $K_{1c}$ (MPa m$^{1/2}$) | .39 | .42 | .42 | .43 | .29 |
| $D_{Pt}$ (cm$^{-1}$) (@400 nm) | .0306 | | .0383 | | .0213 |
| $D_{Wdur}$ (mg/cm²/day) | .0302 | .133 | .265 | .1079 | .075 |
| σ ($10^{-20}$ cm²) | 3.61 | 3.81 | 3.95 | 3.48 | 3.22 |
| $\Delta\lambda_{em}$ (nm) | 26.62 | 25.78 | 25.22 | 27.36 | 28.66 |
| τ (rad) μsec | 348.6 | 342 | 336.5 | 349.5 | 356.5 |
| $\tau_0$ (μsec) | 361.7 | 354 | 351.1 | 375.6 | 371.2 |
| Q ($10^{20}$ cm$^{-3}$) | 7.9 | 8.59 | 8.01 | 5.83 | 6.33 |
| Devit. Coeff. (0 or 1) | 1 | 1 | 0 | 1 | 0 |
| Durabil. Coeff. (0 or 1) | 1 | 0 | 0 | 0 | 1 |

DTA = Differential Thermal Analysis

TABLE 8

| | 29 | 30 | 16 | 31 | 32 | 33 | 34 |
|---|---|---|---|---|---|---|---|
| Mole % Oxide | | | | | | | |
| $P_2O_5$ | 63 | 63 | 63 | 63 | 67 | 65 | 57.6 |
| $Al_2O_3$ | 4 | 4 | 4 | 4 | 4 | 2 | 8.8 |
| $Li_2O$ | | | | | | | |
| $Na_2O$ | | | | | | | |
| $K_2O$ | 25 | 20 | 15 | 10 | 13 | 15 | 17.1 |
| MgO | | | | | | | |
| CaO | 5 | 10 | 15 | 20 | 13 | 15 | |
| BaO | | | | | | | 13.7 |
| $Nd_2/La_2O_3$ | 3.0 | 3.0 | 3.0 | 3.0 | 3.0 | 3.0 | 3.0 |
| $Sb_2O_3$ | | | | | | | |
| $As_2O_3$ | | | | | | | |
| $Nb_2O_5$ | | | | | | | |
| Total | 100 | 100 | 100 | 100 | 100 | 100 | 100.2 |
| Property | | | | | | | |
| κ (@ 90° C.) [W/mK] | .4929 | .5186 | .5516 | .5855 | .5645 | .5301 | .5120 |
| Poisson's ratio, ν | .268 | .262 | .252 | .246 | .249 | .256 | .263 |
| α [$10^{-7}$/°C.]: | | | | | | | |
| (@ 20–300° C.) | 155.5 | 138.3 | 121.8 | 108.4 | 114.7 | 123.8 | 131.0 |
| (@ 20–40° C.) | | | | | | | |
| E [$10^6$ GPa] | 38.8 | 42.8 | 48.2 | 52.2 | 48.8 | 45.1 | 50.0 |
| $K_{1c}$ [MPa m$^{1/2}$] | .41 | .56 | .52 | .55 | .52 | .56 | .40 |
| den [g/cm³] | 2.596 | 2.615 | 2.637 | 2.657 | 2.639 | 2.615 | 2.959 |
| Tg [°C.] | 399 | 416 | 449 | 475 | 448 | 415 | 452 |
| $C_p$ [J/gK] | .690 | .730 | .660 | .700 | .710 | .720 | .610 |
| Dur [mg/cm²/day] | .66 | .38 | .20 | .13 | .12 | .34 | .04 |
| Devit. Test (0 or 1) | 1 | 1 | 1 | 1 | 1 | 1 | 1 |

TABLE 8-continued

|  | 29 | 30 | 16 | 31 | 32 | 33 | 34 |
|---|---|---|---|---|---|---|---|
| $D_{Pt}$ [cm$^{-1}$] (@ 400 nm) |  |  |  |  |  |  |  |
| $\sigma$ [10$^{-20}$ cm$^2$] | 4.34 | 4.16 | 3.93 | 3.73 | 3.99 | 4.12 | 3.68 |
| Q [10$^{20}$ cm$^3$] | 7.72 | 7.86 | 8.58 | 6.90 | 7.30 | 7.81 | 7.50 |
| $n_2$ [10$^{-13}$ esu] | 1.03 | 1.06 | 1.10 | 1.13 | 1.10 | 1.07 | 1.17 |
| $\Delta\lambda_{em}$ [nm] | 24.23 | 24.71 | 25.35 | 26.29 | 24.59 | 24.63 | 25.99 |
| $\tau_0$ [µsec] | 352.4 | 354.8 | 357.1 | 372.8 | 357.7 | 353.5 | 360.7 |
| $\tau_r$ [µsec] | 330.8 | 334.7 | 343.5 | 347.6 | 343.2 | 338.4 | 349.0 |
| $n_d$ | 1.50686 | 1.51259 | 1.51947 | 1.52667 | 1.52064 | 1.51670 | 1.53795 |
| Abbe No. | 67.46 | 67.04 | 66.39 | 66.20 | 66.77 | 67.11 | 66.27 |

TABLE 9

|  | 35 | 36 | 37 | 38 | 39 |
|---|---|---|---|---|---|
| Mole % Oxide |  |  |  |  |  |
| $P_2O_5$ | 65 | 65 | 65 | 65 | 65 |
| $Al_2O_3$ | 4 | 4 | 4 | 4 | 4 |
| $Li_2O$ |  |  |  |  |  |
| $Na_2O$ |  |  |  |  |  |
| $K_2O$ | 14 | 14 | 21 | 14 | 18 |
| MgO |  | 14 | 7 | 7 | 5 |
| CaO | 14 |  |  | 7 | 5 |
| BaO |  |  |  |  |  |
| $Nd_2/La_2O_3$ | 3.0 | 3.0 | 3.0 | 3.0 | 3.0 |
| $Sb_2O_3$ |  |  |  |  |  |
| $As_2O_3$ | .1 | .1 | .1 | .1 | .1 |
| $Nb_2O_5$ | .1 | .1 | .1 | .1 | .1 |
| Total | 100.2 | 100.2 | 100.2 | 100.2 | 100.2 |
| Property |  |  |  |  |  |
| $\kappa$ (90° C.) [W/mK] | .5630 | .6187 | .5440 | .5993 | .5514 |
| Poisson's ratio, $\nu$ | .250 | .259 | .268 | .254 | .261 |
| $\alpha$ [10$^{-7}$/°C.]: |  |  |  |  |  |
| (@ 20–300° C.) | 118.7 | 116.1 | 142.5 | 115.5 | 131.1 |
| (@ 20–40° C.) |  | 95.2 | 107.0 | 100.1 | 120.7 |
| E [10$^6$ GPa] | 48.1 | 51.1 | 42.6 | 50.3 | 45.6 |
| $K_{1c}$ [MPa m$^{1/2}$] | .55 | .48 | .50 | .57 | .64 |
| den [g/cm$^3$] | 2.637 | 2.640 | 2.610 | 2.630 | 2.620 |
| Tg [°C.] | 456 | 463 | 412 | 460 | 425 |
| $C_p$ [J/gK] | .650 | — | — | — | — |
| Dur [mg/cm$^2$/day] | .17 | .08 | .17 | .09 | .13 |
| Devit. Test (0 or 1) | 1 | 1 | 1 | 1 | 1 |
| $D_{Pt}$ [cm$^{-1}$] (@ 400 nm) | .0330 | .0516 | .0745 | .0264 | .0499 |
| $\sigma$ [10$^{-20}$ cm$^2$] | 3.84 | 3.76 | 4.24 | 3.83 | 3.99 |
| Q [10$^{20}$ cm$^{-3}$] | 8.13 | 8.21 | 8.83 | 8.17 | 8.60 |
| $n_2$ [10$^{-13}$ esu] | 1.09 | 1.06 | 1.04 | 1.08 | 1.05 |
| $\Delta\lambda_{em}$ [nm] | 25.63 | 25.36 | 24.17 | 25.45 | 24.61 |
| $\tau_0$ [µsec] | 356.0 | 355.6 | 349.6 | 356.0 | 351.8 |
| $\tau_r$ [µsec] | 344.9 | 361.1 | 344.7 | 356.5 | 350.0 |
| $n_d$ | 1.51959 | 1.51696 | 1.50917 | 1.51838 | 1.51347 |
| Abbe No. | 66.87 | 67.71 | 67.62 | 67.17 | 67.56 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a high energy laser system utilizing phosphate laser glass components, the improvement wherein said phosphate laser glass components have an emission bandwidth of $\geq 26.29$ nm and a coefficient of thermal expansion, $\alpha$, from 20°–300° C. of $<145\times10^{-7}$/K, and said laser glass components consist essentially of (on an oxide composition basis):

|  | Mole % |
|---|---|
| $P_2O_5$ | 50–75 |
| $Al_2O_3$ | >0–10 |
| $K_2O$ | >0–30 |
| MgO | 0–30 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |

-continued

| | Mole % |
|---|---|
| SrO | 0–20 |
| BaO | 0–20 |
| ZnO | 0–20 |
| Pbo | 0–20 |
| $B_2O_3$ | 0–10 |
| $Y_2O_3$ | 0–10 |
| $La_2O_3$ | 0–8 |
| $Nd_2O_3$ | 0.3–8 | wherein the sum of MgO and CaO is >0–30;

the sum of $Li_2O$, $Na_2O$, $Rb_2O$, and $Cs_2O$ is 0–20;

the sum of BeO, SrO, BaO, ZnO, and PbO is 0–20;

the sum of $B_2O_3$ and $Y_2O_3$ is 0–10; and wherein said system operates at an energy level of at least 0.1 MJ.

2. A laser system according to claim 1, wherein said glass consists essentially of:

| | Mole % |
|---|---|
| $P_2O_5$ | 55–75 |
| $Al_2O_3$ | 1–9 |
| $K_2O$ | 8–28 |
| MgO | 0–24 |
| CaO | 0–24 |
| $Li_2O$ | 0–15 |
| $Na_2O$ | 0–15 |
| $Rb_2O$ | 0–15 |
| $Cs_2O$ | 0–15 |
| BeO | 0–15 |
| SrO | 0–15 |
| BaO | 0–15 |
| ZnO | 0–15 |
| PbO | 0–15 |
| $B_2O_3$ | 0–8 |
| $Y_2O_3$ | 0–8 |
| $La_2O_3$ | 0–5 |
| $Nd_2O_3$ | 0.3–8 | wherein the sum of MgO and CaO is 4–24;

the sum of $Li_2O$, $Na_2O$, $Rb_2O$, and $Cs_2O$ is 0–15;

the sum of BeO, SrO, BaO, ZnO, and PbO is 0–15; and the sum of $B_2O_3$ and $Y_2O_3$ is 0–8.

3. A laser system according to claim 1, wherein said glass consists essentially of:

| | Mole % |
|---|---|
| $P_2O_5$ | 60–70 |
| $Al_2O_3$ | 2–6 |
| $K_2O$ | 10–24 |
| MgO | 0–20 |
| CaO | 0–20 |
| $Li_2O$ | 0–10 |
| $Na_2O$ | 0–10 |
| $Rb_2O$ | 0–10 |
| $Cs_2O$ | 0–10 |
| BeO | 0–10 |
| SrO | 0–10 |
| BaO | 0–10 |
| ZnO | 0–10 |
| PbO | 0–10 |
| $B_2O_3$ | 0–5 |
| $Y_2O_3$ | 0–5 |
| $La_2O_3$ | 0–4 |
| $Nd_2O_3$ | 0.3–8 | wherein the sum of MgO and CaO is 5–20;

the sum of $Li_2O$, $Na_2O$, $Rb_2O$, and $Cs_2O$ is 0–10; and the sum of BeO, SrO, BaO, ZnO, and PbO is 0–10;

the sum of $B_2O_3$ and $Y_2O_3$ is 0–5.

4. A laser system according to claim 1, wherein said laser glass components exhibit the following properties:

| | |
|---|---|
| κ, thermal conductivity | >0.5 W/mK |
| ν, Poisson's ratio | <.28 |
| α, thermal expansion from 20–300° | $<145 \times 10^{-7}$/K |
| E, Young's modulus | <50 GPa |
| $K_{1c}$, fracture toughness | >0.40 MPa $m^{1/2}$ |
| ρ, glass density | >2.60 g/$cm^3$ |
| $C_p$, glass heat capacity | >0.50 J/gK |
| σ, cross section | $>3.5 \times 10^{-20}$ $cm^2$ |
| Q, concentration quenching factor | $>7 \times 10^{20}$ $cm^{-3}$ |
| $n_2$, non-linear refractive index | $<1.2 \times 10^{-13}$ esu |
| $T_g$, glass transformation point | <460° C. |
| $D_{wdur}$, durability of the glass to water | <0.20 mg/$cm^2$ day |
| $D_{Pt}$, platinum solubility (@ 400 nm) | >0.03 $cm^{-1}$. |

5. A laser system according to claim 4, wherein said laser glass has the following properties:

| | |
|---|---|
| κ, thermal conductivity | >0.55 W/mK |
| α, thermal expansion from 20–300° C. | $<140 \times 10^{-7}$/K |
| E, Young's modulus | <45 GPa |
| $K_{1c}$, fracture toughness | >0.50 MPa $m^{1/2}$ |
| σ, cross section | $>4.0 \times 10^{-20}$ $cm^2$ |
| Q, concentration quenching factor | $>8 \times 10^{20}$ $cm^{-3}$ |
| $n_2$, non-linear refractive index | $<1.1 \times 10^{-13}$ esu. |

6. A laser system according to claim 1, wherein the molar ratio of $P_2O_5/(3\Sigma R_2O_3+MgO)$ is at least 1.5, wherein R is Al, La, Ln, Y, and B.

7. A laser system according to claim 1, wherein the value of $\sigma O/n_2$ for said laser glass is >25 $(esu.cm)^{-1}$.

8. A laser system according to claim 1, wherein the value of $\kappa(1-\nu)/\alpha E$ for said laser glass is $>0.60 \times 10^{-6}$ $m^2$/sec.

9. A laser system according to claim 1, wherein the value of $D_{Pt}$ of said laser glass is >0.025 $cm^{-1}$ at 400 nm.

10. A laser system according to claim 1, wherein said laser glass has a non-linear refractive index of $<1.2 \times 10^{-13}$ esu.

11. A laser system according to claim 1, wherein the cross section, σ, of said laser glass is $>3.5 \times 10^{-20}$ $cm^2$.

12. A laser system according to claim 1, wherein the concentration quenching factor, Q, of said laser glass is $>7 \times 10^{20}$ $cm^{-3}$.

13. In a method of generating a high energy laser beam, the improvement wherein said laser beam is generated by a laser system according to claim 1.

14. A laser system according to claim 1, wherein said laser glass contains 2–8.8 mole % $Al_2O_3$, has a $T_g$ value of ≦499.2° C., and a cross-section of $\geq 3.68 \times 10^{-20}$ $cm^2$.

15. A laser system according to claim 14, wherein said laser glass contains 2–8 mole % $Al_2O_3$.

16. A laser system according to claim 15, wherein said laser glass has a $T_g$ value of ≦ about 463° C.

17. A laser system according to claim 15, wherein said laser glass has the following properties:

| | |
|---|---|
| κ, thermal conductivity | ≧0.51 W/mK |
| α, thermal expansion from 20–300° C. | $<145 \times 10^{-7}$/K |
| E, Young's modulus | ≦52.6 GPa |
| $K_{1c}$, fracture toughness | >0.40 MPa $m^{1/2}$ |
| σ, cross section | $>3.5 \times 10^{-20}$ $cm^2$ |
| Q, concentration quenching factor | $\geq 8 \times 10^{20}$ $cm^{-3}$ |
| $n_2$, non-linear refractive index | $\leq 1.16 \times 10^{-13}$ esu. |

18. A laser system according to claim 15, wherein said laser glass contains 10–24 mole % $K_2O$.

19. A laser system according to claim 18, wherein said laser glass contains 0 mole % BaO.

20. A laser system according to claim 1, wherein said laser glass has the following properties:

| | |
|---|---|
| κ, thermal conductivity | $\geq 0.51$ W/mK |
| α, thermal expansion from 20–300° C. | $<145 \times 10^{-7}$/K |
| E, Young's modulus | $\leq 52.6$ GPa |
| $K_{1c}$, fracture toughness | $>0.40$ MPa m$^{1/2}$ |
| σ, cross section | $>3.5 \times 10^{-20}$ cm$^2$ |
| Q, concentration quenching factor | $\geq 8 \times 10^{20}$ cm$^{-3}$ |
| $n_2$, non-linear refractive index | $\leq 1.16 \times 10^{-13}$ esu. |

21. A laser system according to claim 1, wherein said laser glass contains 10–24 mole % $K_2O$.

22. A laser system according to claim 1, wherein said laser glass contains 0 mole % BaO.

23. A laser system according to claim 22, wherein said laser glass contains 0 mole % $Li_2O$.

24. A laser system according to claim 1, wherein said laser glass contains 0 mole % $Li_2O$.

25. A laser system according to claim 1, wherein said laser glass components contain >0–30 mole % MgO.

26. A laser system according to claim 25, wherein said laser glass components contain 1–30 mole % MgO.

27. A laser system according to claim 1, wherein said glass components have an emission bandwidth of <26 nm.

28. A laser system according to claim 1, wherein said laser glass components contain 0–5 mole % $Na_2O$.

29. A laser system according to claim 1, wherein in said laser glass components the sum of $Li_2O$, $Na_2O$, $Rb_2O$ and $Cs_2O$ is 0–9 mole %.

30. In a high energy laser system utilizing phosphate laser glass components, the improvement wherein said phosphate laser glass components have an emission bandwidth of less than about 26 nm and a coefficient of thermal expansion, α, from 20°–300° C. of $<145 \times 10^{-7}$/K, and said laser glass components consist essentially of (on an oxide composition basis):

| | Mole % |
|---|---|
| $P_2O_5$ | 50–75 |
| $Al_2O_3$ | >0–10 |
| $K_2O$ | >0–30 |
| MgO | 0–30 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| non-lanthanide lasing species | 0.01–8 | wherein the sum of MgO and CaO is >0–30;

the sum of $Li_2O$, $Na_2O$, $Rb_2O$, and $Cs_2O$ is 0–20;

the sum of BeO, SrO, BaO, ZnO, and PbO is 0–20; and the sum of $B_2O_3$ and $Y_2O_3$ is 0–10.

31. A laser system according to claim 30, wherein said system operates at an energy level of at least 0.1 MJ.

32. A doped laser glass cladding composition consisting essentially of a (on an oxide composition basis):

| | Mole % |
|---|---|
| $P_2O_5$ | 50–75 |
| $Al_2O_3$ | >0–10 |
| $K_2O$ | >0–30 |
| MgO | 0–30 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| $La_2O_3$ | 0.1–8 | wherein the sum of MgO and CaO is >0–30;

the sum of $Li_2O$, $Na_2O$, $Rb_2O$, and $Cs_2O$ is 0–20;

the sum of BeO, SrO, BaO, ZnO, and PbO is 0–20; and the sum of $B_2O_3$ and $Y_2O_3$ is 0–10; and wherein said composition further contains >0.0–2 wt. % $Cu_2O$ or 10–30 wt. % $Sm_2O_3$ as a dopant.

33. In a high energy laser system utilizing phosphate laser glass components, the improvement wherein said phosphate laser glass components have an emission bandwidth of $\leq 26.29$ nm and a coefficient of thermal expansion, α, from 20°–300° C. of $<145 \times 10^{-7}$/K, and said laser glass components consist essentially of (on an oxide composition basis):

| | Mole % |
|---|---|
| $P_2O_5$ | 50–75 |
| $Al_2O_3$ | >0–10 |
| $K_2O$ | >0–30 |
| MgO | 0–30 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| $La_2O_3$ | 0–8 |
| $Ln_2O_3$ | 0.1–5 | wherein the sum of MgO and CaO is >0–30;

the sum of $Li_2O$, $Na_2O$, $Rb_2O$, and $Cs_2O$ is 0–20;

the sum of BeO, SrO, BaO, ZnO, and PbO is 0–20;

the sum of $B_2O_3$ and $Y_2O_3$ is 0–10;

$Ln_2O_3$ is the sum of the oxides of lanthanides of atomic numbers 58–71; and wherein said system operates at an energy level of at least 0.1 MJ.

34. A laser system according to claim 33, wherein said laser glass contains 0.01–5 mole % $Nd_2O_3$.

35. A laser system according to claim 33, wherein said glass components have an emission bandwidth of <26 nm.

36. In a high energy laser system utilizing phosphate laser glass components, the improvement wherein said phosphate laser glass components have an emission bandwidth of ≦26.29 nm and a coefficient of thermal expansion, α, from 20°–300° C. of <145×10⁻⁷/K, and said laser glass components consist essentially of (on an oxide composition basis):

|  | Mole % |
|---|---|
| $P_2O_5$ | 50–75 |
| $Al_2O_3$ | >0–10 |
| $K_2O$ | >0–30 |
| MgO | 0–30 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| $La_2O_3$ | 0–8 |
| $Ln_2O_3$ | 0.01–8 | wherein the sum of MgO and CaO is >0–30;

the sum of $Li_2O$, $Na_2O$, $Rb_2O$, and $Cs_2O$ is 0–20;

the sum of BeO, SrO, BaO, ZnO, and PbO is 0–20;

the sum of $B_2O_3$ and $Y_2O_3$ is 0–10;

$Ln_2O_3$ is the sum of the oxides of lanthanides of atomic numbers 58–71;

wherein said glass does not contain Er as an active lasing species; and wherein said system operates at an energy level of at least 0.1 MJ.

37. A laser system according to claim 36, wherein said laser glass contains 0.01–8 mole % $Nd_2O_3$.

38. A laser system according to claim 36, wherein said glass components have an emission bandwidth of <26 nm.

39. In a high energy laser system utilizing phosphate laser glass components, the improvement wherein said phosphate laser glass components have an emission bandwidth of ≦26.29 nm and a coefficient of thermal expansion, α, from 20°–300° C. of <145×10⁻⁷/K, and said laser glass components consist essentially of (on an oxide composition basis):

|  | Mole % |
|---|---|
| $P_2O_5$ | 50–75 |
| $Al_2O_3$ | >0–10 |
| $K_2O$ | >0–30 |
| MgO | 0–30 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| $La_2O_3$ | 0–8 |
| $Ln_2O_3$ | 0.01–8 | wherein the sum of MgO and CaO is >0–30;

the sum of $Li_2O$, $Na_2O$, $Rb_2O$, and $Cs_2O$ is 0–20;

the sum of BeO, SrO, BaO, ZnO, and PbO is 0–20;

the sum of $B_2O_3$ and $Y_2O_3$ is 0–10;

$Ln_2O_3$ is the sum of the oxides of lanthanides of atomic numbers 58–71;

wherein said glass does not contain Yb; and wherein said system operates at a energy level of at least 0.1 MJ.

40. A laser system according to claim 39, wherein said laser glass contains 0.01–8 mole % $Nd_2O_3$.

41. A laser system according to claim 39, wherein said glass components have an emission bandwidth of <26 nm.

42. A phosphate laser glass for use in high energy laser systems consisting essentially of (on an oxide composition basis):

|  | Mole % |
|---|---|
| $P_2O_5$ | 50–75 |
| $Al_2O_3$ | >0–10 |
| $K_2O$ | >0–30 |
| MgO | >0–30 |
| CaO | 7–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| $La_2O_3$ | 0–8 |
| $Nd_2O_3$ | 0.3–8 | wherein the sum of $Li_2O$, $Na_2O$, $Rb_2O$, and $Cs_2O$ is 0–20;

the sum of BeO, SrO, BaO, ZnO, and PbO is 0–20;

the sum of $B_2O_3$ and $Y_2O_3$ is 0–10;

the sum of MgO and CaO is 7–30; and said glass exhibits the following properties:

| | |
|---|---|
| κ, thermal conductivity | >0.5 W/mK |
| ν, Poisson's ratio | <.28 |
| α, thermal expansion from 20–300° | <145 × 10⁻⁷/K |
| E, Young's modulus | <50 GPa |
| $K_{1c}$, fracture toughness | >0.40 MPa·m^(1/2) |
| ρ, glass density | >2.60 g/cm³ |
| $C_p$, glass heat capacity | >0.50 J/gK |
| σ, cross section | >3.5 × 10⁻²⁰ cm² |
| $n_2$, non-linear refractive index | <1.2 × 10⁻¹³ esu |
| $T_g$, glass transformation point | <460° C. |
| $D_{wdur}$, durability of the glass to water | <0.20 mg/cm² day |
| $D_{pt}$, platinum solubility (@400 nm) | >0.03 cm⁻¹. |

43. A glass according to claim 42, wherein said glass contains 1–9 mole % $Al_2O_3$.

44. A phosphate laser glass according to claim 42, wherein said glass contains 0–5 mole % $Na_2O$.

45. A phosphate laser glass according to claim 42, wherein the sum of $Li_2O$, $Na_2O$, $Rb_2O$ and $Cs_2O$ is 0–9 mole %.

46. A phosphate laser glass according to claim 42, wherein said glass contains 1–30 mole % MgO.

47. A phosphate laser glass according to claim 42, wherein the glass transformation point, $T_g$, is <460° C.

48. A phosphate laser glass for use in high energy laser systems consisting essentially of (on an oxide composition basis):

|  | Mole % |
| --- | --- |
| $P_2O_5$ | 50–75 |
| $Al_2O_3$ | >0–10 |
| $K_2O$ | >0–30 |
| MgO | >0–7 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| $La_2O_3$ | 0–8 |
| $Nd_2O_3$ | 0.3–8 | wherein the sum of MgO and CaO is >0–30;

the sum of $Li_2O$, $Na_2O$, $Rb_2O$, and $Cs_2O$ is 0–20;

the sum of BeO, SrO, BaO, ZnO, and PbO is 0–20;

the sum of $B_2O_3$ and $Y_2O_3$ is 0–10; and said glass exhibits the following properties:

| κ, thermal conductivity | >0.5 W/mK |
| --- | --- |
| ν, Poisson's ratio | <.28 |
| α, thermal expansion from 20–300° | <145 × $10^{-7}$/K |
| E, Young's modulus | <50 GPa |
| $K_{1c}$, fracture toughness | >0.40 MPa $m^{1/2}$ |
| ρ, glass density | >2.60 g/$cm^3$ |
| $C_p$, glass heat capacity | >0.50 J/gK |
| σ, cross section | >3.5 × $10^{-20}$ $cm^2$ |
| $n_2$, non-linear refractive index | <1.2 × $10^{-13}$ esu |
| $T_g$, glass transformation point | <460° C. |
| $D_{wdur}$, durability of the glass to water | <0.20 mg/$cm^2$ day |
| $D_{pt}$, platinum solubility (@400 nm) | >0.03 $cm^{-1}$. |

49. A glass according to claim 48, wherein said laser glass contains 2–8.8 mole % $Al_2O_3$, has a $T_g$ value of ≦499.2° C. and a cross-section of ≧3.68×$10^{-20}$ $cm^2$.

50. A glass according to claim 48, wherein said glass contains 2–8 mole % $Al_2O_3$.

51. A glass according to claim 50, wherein said glass has a $T_g$ value of ≦ about 463° C.

52. A phosphate laser glass according to claim 48, wherein said glass contains 1–7 mole % MgO.

53. A phosphate laser glass according to claim 48, wherein said glass contains 0–5 mole % $Na_2O$.

54. A phosphate laser glass according to claim 48, wherein the sum of $Li_2O$, $Na_2O$, $Rb_2O$ and $Cs_2O$ is 0–9 mole %.

55. A phosphate laser glass according to claim 48, wherein the glass transformation point, $T_g$, is <460° C.

56. An optical glass component consisting essentially of (on an oxide composition basis):

|  | Mole % |
| --- | --- |
| $P_2O_5$ | 50–75 |
| $Al_2O_3$ | 1–9 |
| $K_2O$ | >0–30 |
| MgO | 0–30 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| $La_2O_3$ | 0.1–8 | wherein said glass does not contain an active lasing species;

the sum of MgO and CaO is >0–30;

the sum of $Li_2O$, $Na_2O$, $Rb_2O$, and $Cs_2O$ is 0–20;

the sum of BeO, SrO, BaO, ZnO, and PbO is 0–20; and the sum of $B_2O_3$ and $Y_2O_3$ is 0–10.

57. A phosphate laser glass for use in high energy laser systems consisting essentially of (on an oxide composition basis):

|  | Mole % |
| --- | --- |
| $P_2O_5$ | 50–75 |
| $Al_2O_3$ | >0–10 |
| $K_2O$ | >0–30 |
| MgO | 0–30 |
| CaO | 7–30 |
| $Li_2O$ |  |
| $Na_2O$ | 0–20 |
| $Rb_2O$ | 0–5 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| $La_2O_3$ | 0–8 |
| $Nd_2O_3$ | 0.3–8 | wherein the sum of $Li_2O$, $Na_2O$, $Rb_2O$, and $Cs_2O$ is 0–20;

the sum of BeO, SrO, BaO, ZnO, and PbO is 0–20;

the sum of $B_2O_3$ and $Y_2O_3$ is 0–10;

the sum of MgO and CaO is 7–30; and said glass exhibits the following properties:

| κ, thermal conductivity, | >0.5 W/mK |
| --- | --- |
| ν, Poisson's ratio | <.28 |
| α, thermal expansion from 20–300° | <145 × $10^{-7}$/K |
| E, Young's modulus | <50 GPa |
| $K_{1c}$, fracture toughness | >0.40 MPa $m^{1/2}$ |
| ρ, glass density | >2.60 g/$cm^3$ |
| $C_p$, glass heat capacity | >0.50 J/gK |
| σ, cross section | >3.5 × $10^{-20}$ $cm^2$ |
| Q, concentration quenching factor | >7 × $10^{20}$ $cm^{-3}$ |
| $n_2$, non-linear refractive index | <1.2 × $10^{-13}$ esu |
| $D_{wdur}$, durability of the glass to water | <0.20 mg/$cm^2$ day |
| $D_{pt}$, platinum solubility (@400 nm) | >0.03 $cm^{-1}$. |

58. A phosphate laser glass for use in high energy laser systems consisting essentially of (on an oxide composition basis):

| | Mole % |
|---|---|
| $P_2O_5$ | 50–75 |
| $Al_2O_3$ | >0–10 |
| $K_2O$ | >0–30 |
| MgO | 0–30 |
| CaO | 7–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| Pbo | 0–20 |
| $B_2O_3$ | 0–10 |
| $Y_2O_3$ | 0–10 |
| $La_2O_3$ | 0–8 |
| $Nd_2O_3$ | 0.3–8 | wherein the sum of $Li_2O$, $Na_2O$, $Rb_2O$, and $Cs_2O$ is 0–9;

the sum of BeO, Sro, BaO, ZnO, and PbO is 0–20;

the sum of $B_2O_3$ and $Y_2O_3$ is 0–10;

the sum of MgO and CaO is 7–30; and said glass exhibits the following properties:

| | |
|---|---|
| $\kappa$, thermal conductivity | >0.5 W/mK |
| $\nu$, Poisson's ratio | <.28 |
| $\alpha$, thermal expansion from 20–300° | $<145 \times 10^{-7}$/K |
| E, Young's modulus | <50 GPa |
| $K_{1c}$, fracture toughness | >0.40 MPa $m^{1/2}$ |
| $\rho$, glass density | >2.60 g/$cm^3$ |
| $C_p$, glass heat capacity | >0.50 J/gK |
| $\sigma$, cross section | $>3.5 \times 10^{-20}$ $cm^2$ |
| Q, concentration quenching factor | $>7 \times 10^{20}$ $cm^{-3}$ |
| $n_2$, non-linear refractive index | $<1.2 \times 10^{-13}$ esu |
| $D_{wdur}$, durability of the glass to water | <0.20 mg/$cm^2$ day |
| $D_{pt}$, platinum solubility (@400 nm) | 0.03 $cm^{-1}$. |

59. A phosphate laser glass for use in high energy laser systems consisting essentially of (on an oxide composition basis):

| | Mole % |
|---|---|
| $P_2O_5$ | 50–75 |
| $Al_2O_3$ | >0–10 |
| $K_2O$ | >0–30 |
| MgO | 0–7 |
| CaO | 0–30 |
| $Li_2O$ | 0–20 |
| $Na_2O$ | 0–5 |
| $Rb_2O$ | 0–20 |
| $Cs_2O$ | 0–20 |
| BeO | 0–20 |
| SrO | 0–20 |
| BaO | 0–20 |
| ZnO | 0–20 |
| Pbo | 0–20 |
| $B_2O_3$ | 0–10 |
| $Y_2O_3$ | 0–10 |
| $La_2O_3$ | 0–8 |
| $Nd_2O_3$ | 0.3–8 | wherein the sum of MgO and CaO is >0–30;

the sum of $Li_2O$, $Na_2O$, $Rb_2O$, and $Cs_2O$ is 0–20;

the sum of BeO, SrO, BaO, ZnO, and PbO is 0–20;

the sum of $B_2O_3$ and $Y_2O_3$ is 0–10; and said glass exhibits the following properties:

| | |
|---|---|
| $\kappa$, thermal conductivity | >0.5 W/mK |
| $\nu$, Poisson's ratio | <.28 |
| $\alpha$, thermal expansion from 20–300° | $<145 \times 10^{-7}$/K |
| E, Young's modulus | <50 GPa |
| $K_{1c}$, fracture toughness | >0.40 MPa $m^{1/2}$ |
| $\rho$, glass density | >2.60 g/$cm^3$ |
| $C_p$, glass heat capacity | >0.50 J/gK |
| $\sigma$, cross section | $>3.5 \times 10^{-20}$ $cm^2$ |
| Q, concentration quenching factor | $>7 \times 10^{20}$ $cm^{-3}$ |
| $n_2$, non-linear refractive index | $<1.2 \times 10^{-13}$ esu |
| $D_{wdur}$, durability of the glass to water | <0.20 mg/$cm^2$ day |
| $D_{pt}$, platinum solubility (@400 nm) | >0.03 $cm^{-1}$. |

60. A phosphate laser glass for use in high energy laser systems consisting essentially of (on an oxide composition basis):

| | Mole % |
|---|---|
| $P_2O_5$ | 50–75 |
| $Al_2O_3$ | >0–10 |
| $K_2O$ | >0–30 |
| MgO | 0–7 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| Pbo | 0–20 |
| $B_2O_3$ | 0–10 |
| $Y_2O_3$ | 0–10 |
| $La_2O_3$ | 0–8 |
| $Nd_2O_3$ | 0.3–8 | wherein the sum of MgO and CaO is >0–30;

the sum of $Li_2O$, $Na_2O$, $Rb_2O$, and $Cs_2O$ is 0–9;

the sum of BeO, SrO, BaO, ZnO, and PbO is 0–20;

the sum of $B_2O_3$ and $Y_2O_3$ is 0–10; and said glass exhibits the following properties:

| | |
|---|---|
| $\kappa$, thermal conductivity | >0.5 W/mK |
| $\nu$, Poisson's ratio | <.28 |
| $\alpha$, thermal expansion from 20–300° | $<145 \times 10^{-7}$/K |
| E, Young's modulus | <50 GPa |
| $K_{1c}$, fracture toughness | >0.40 MPa $m^{1/2}$ |
| $\rho$, glass density | >2.60 g/$cm^3$ |
| $C_p$, glass heat capacity | >0.50 J/gK |
| $\sigma$, cross section | $>3.5 \times 10^{-20}$ $cm^2$ |
| Q, concentration quenching factor | $>7 \times 10^{20}$ $cm^{-3}$ |
| $n_2$, non-linear refractive index | $<1.2 \times 10^{-13}$ esu |
| $D_{wdur}$, durability of the glass to water | <0.20 mg/$cm^2$ day |
| $D_{pt}$, platinum solubility (@400 nm) | >0.03 $cm^{-1}$. |

61. In a high energy laser system utilizing phosphate laser glass components, the improvement Wherein said phosphate laser glass components have an emission bandwidth of $\leq 26.29$ nm and a coefficient of thermal expansion, $\alpha$, from 20°–300° C. of $<145 \times 10^{-7}$/K, and said laser glass components consist essentially of (on an oxide composition basis):

|  | Mole % |
|---|---|
| $P_2O_5$ | 50–75 |
| $Al_2O_3$ | >0–10 |
| $K_2O$ | >0–30 |
| MgO | >0–30 |
| CaO | 0–30 |
| $Li_2O$ | 0–20 |
| $Na_2O$ | 0–20 |
| $Rb_2O$ | 0–20 |
| $Cs_2O$ | 0–20 |
| BeO | 0–20 |
| SrO | 0–20 |
| BaO | 0–20 |
| ZnO | 0–20 |
| PbO | 0–20 |
| $B_2O_3$ | 0–10 |
| $Y_2O_3$ | 0–10 |
| $La_2O_3$ | 0–8 |
| $Nd_2O_3$ | 0.3–8 | wherein the sum of MgO and CaO is >0–30;

the sum of $Li_2O$, $Na_2O$, $Rb_2O$, and $Cs_2O$ is 0–20;

the sum of BeO, SrO, BaO, ZnO, and PbO is 0–20; and the sum of $B_2O_3$ and $Y_2O_3$ is 0–10.

* * * * *